United States Patent
Goddard et al.

(10) Patent No.: US 6,414,678 B1
(45) Date of Patent: *Jul. 2, 2002

(54) IMAGE CREATING APPARATUS AND IMAGE DISPLAY APPARATUS

(75) Inventors: Giles Goddard; Takao Sawano, both of Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/547,081

(22) Filed: Apr. 11, 2000

Related U.S. Application Data

(62) Division of application No. 08/975,359, filed on Nov. 20, 1997.

(51) Int. Cl.⁷ ................................................ G06T 15/00
(52) U.S. Cl. .................... 345/419; 345/420; 345/629
(58) Field of Search ................................. 345/419, 420

(56) References Cited

U.S. PATENT DOCUMENTS

| | | | |
|---|---|---|---|
| 5,634,850 A | 6/1997 | Kitahara et al. | |
| 5,825,363 A | 10/1998 | Anderson | |
| 6,104,402 A | * 8/2000 | Goddard et al. | 345/419 |

* cited by examiner

*Primary Examiner*—Matthew Luu
*Assistant Examiner*—Motilewa Good-Johnson
(74) *Attorney, Agent, or Firm*—Nixon & Vanderhye P.C.

(57) ABSTRACT

An image creating apparatus, adapted to create an image constituted by of a plurality of dots for each of a plurality of background scenes that are visually perceived as viewed in different two or more directions from a certain view point existing in a three-dimensional space, is provided with a memory which stores polygon image data composed of three-dimensional coordinate data and texture data for each of a plurality of polygons representative of an object, color data for each dot of the plurality of background scenes and depth data for each dot of the plurality of background scenes. In converting the polygon image data into dot image data, the color data and the depth data are, for each dot, written in the memory on the basis of the texture data and the three-dimensional coordinate data, respectively.

22 Claims, 18 Drawing Sheets

F I G. 1
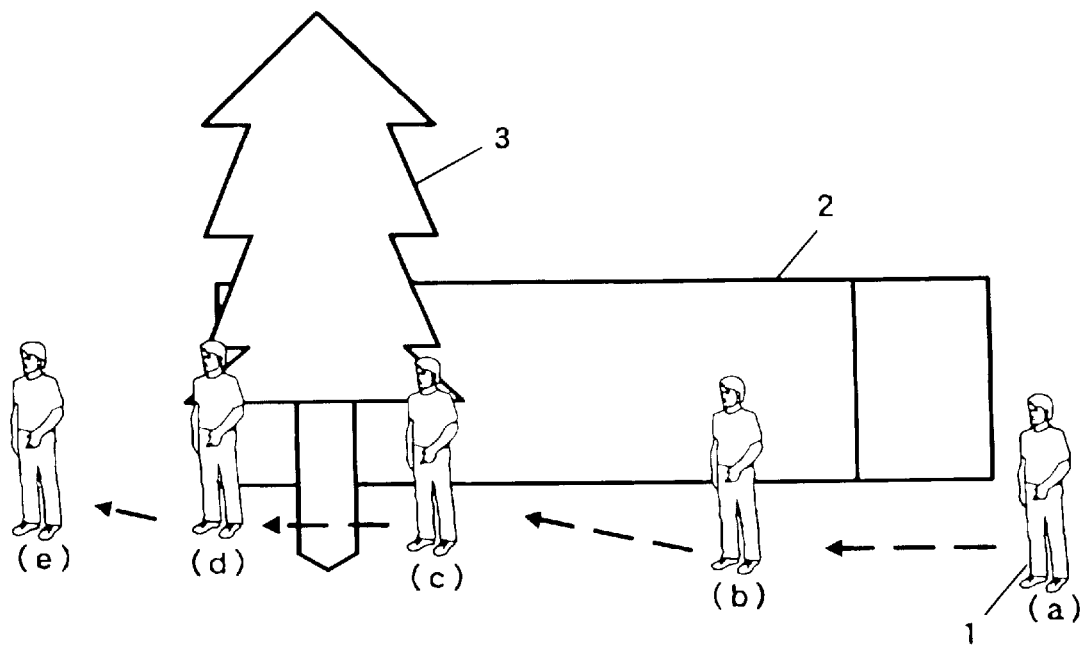

F I G. 1 8
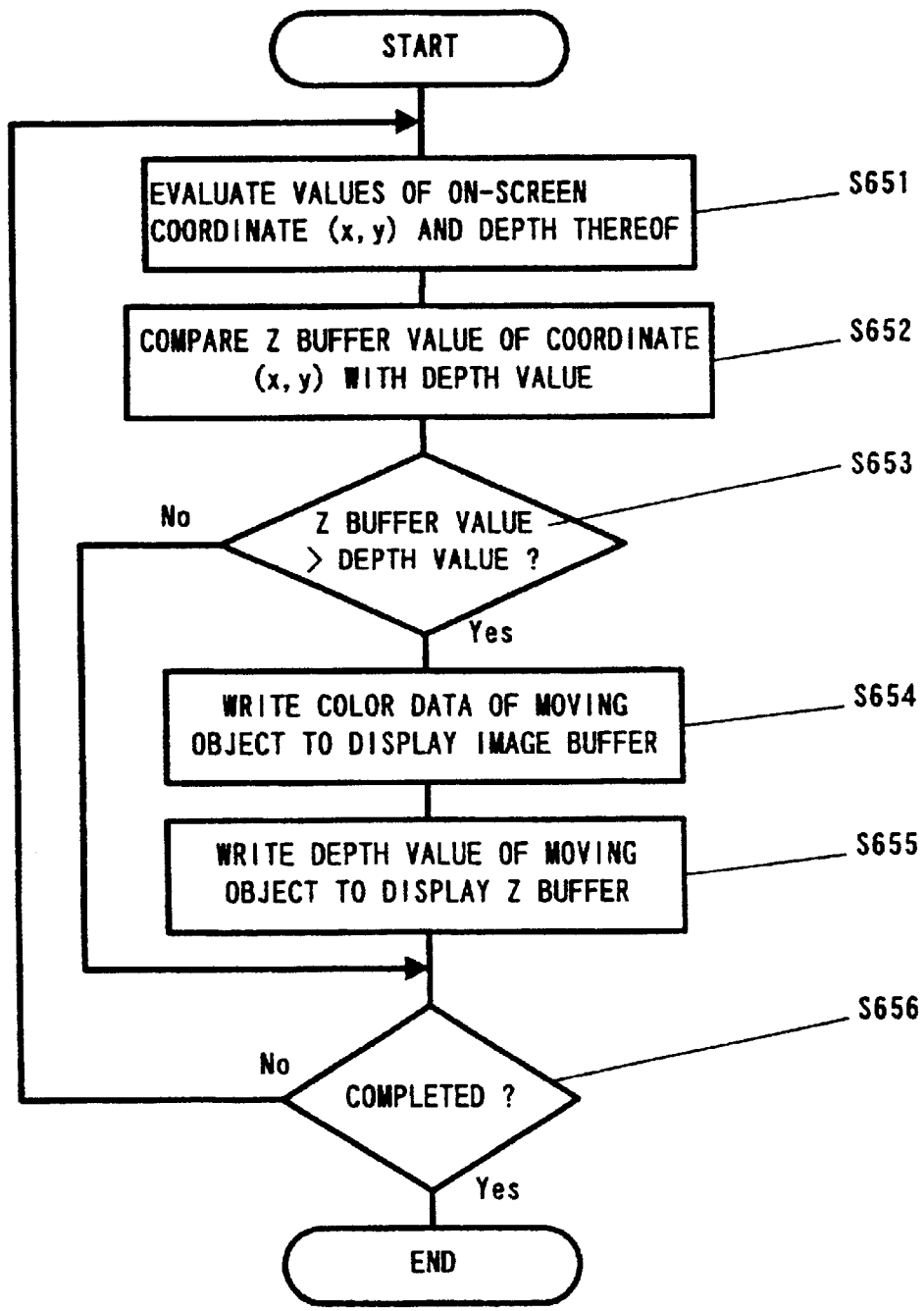

IMAGE CREATING APPARATUS AND IMAGE DISPLAY APPARATUS

This is a divisional of application Ser. No. 08/975,359, filed Nov. 20, 1997, now pending, the entire content of which is hereby incorporated by reference in this application.

BACKGROUND OF THE INVENTION

1. Field of the invention

This invention relates to image creating apparatuses and image display apparatuses. More particularly, this invention relates to an image creating apparatus and image display apparatus for generating and/or displaying image data approximated for representing realistic three-dimensional images, particularly when the images are displayed using polygon representation.

2. Description of the Prior Art

In conventional games of three-dimensional representation (3D), images of background objects and moving objects are merely displayed through three-dimensional image data involving three-dimensional coordinate data and textures (patterns and material feelings including colors) as if the images were photographed in a predetermined direction by a camera located at a predetermined distance.

Meanwhile, conventional games of two-dimensional representation can display images, in combination, of the background object (or background character or background picture) and the moving object (moving character or game hero character, etc.). However, the relation in position between the background object and the moving object is determined only either one of at the front or the rear of the background object with reference to the moving object. It is therefore impossible to display the background objects depicted between a plurality of background objects (e.g. between a house and a mountain or between a car and a building, or the like) in one background scene by merely setting the backward-forward relation for each background object. To this end, the conventional background image is nothing more than a mere planar image with no depth data, so that the moving object (e.g. hero character) thus depicted, upon passing between a plurality of other background objects, cannot be represented as if it passed behind or in front of or between the objects in away of perspective representation with depth given for the objects.

FIG. 1 is a view showing an on-screen space for displaying background objects and a moving object due to a conventional technique. The example of FIG. 1 shows a case that, when rendering a person as a moving object 1 and depicting a building 2 and a tree 3 as background objects, the moving object 1 is represented in preference to the background objects. That is, the moving object 1 is set at a higher order of priority than the background objects 2 and 3. In this case, the moving object 1 is displayed as if it existed in front of the building 2 during movement from a position (a) to a position (b) and from the position (b) to the position (c), whereas it is represented at the front of the tree 3 during movement from a position (c) to a position (d). The moving object 1 in movement from the position (d) to a position (e) is displayed (solely) without superposition over the background.

FIG. 2 is a view showing an on-screen space for displaying background objects and a moving object due to the conventional technique. In an example of FIG. 2, a person is depicted as a moving object 1 and a building 2 and a tree 3 are drawn as background objects, wherein the moving body 1 is set in lower priority than the background objects 2 and 3. In this case, when the moving object 1 in movement from a position (a) to a position (b) comes to a position that is overlapped with the building 2, no representation is made for the portion overlapped with the building 2, thereby displaying the person as if he was behind the building. During movement from the position (b) to a position (d), display is similarly done. Thereafter, when the moving object 1 passes past an left end of the building 2 and further moves from the position (d) to a position (e), it is solely displayed because of the absence of the building 2 or the tree 3 there.

In the conventional art, when the moving object 1 becomes overlapped with the background object 2 or 3, nothing is done more than display only with either one of the moving object 1 or the background object 2 and 3 which is higher in priority order. This is because the data defining the depth (depth data) is not assigned to each of the background objects and the moving object.

Where a three-dimensional image is displayed on a display depending upon three-dimensional data (or polygon data; i.e. coordinate data at polygon corners X, Y, Z) for representing an object (including background objects and/or moving objects; background characters, also referred to as moving characters) constituted by gathering of a plurality of polygons, there is a necessity of representing a greater number of polygons in order to display an image with higher reality and precision. However, it takes long time for computation, as the number of polygons increases greater. There often encountered is a case where the computation for representing one frame of a three-dimensional image becomes impossible for one frame (or during vertical blanking), resulting in overburdening of processing. The resulting display image might be unnatural of movement just like frame-basis feeding. Thus, there has been a difficulty of smoothly changing in real time the three-dimensional image.

On the other hand, where the background object is displayed by combining with a moving object (hero character), there has been no setting in the forward-backward relation between the background object depicted in the background scene and the moving object. As a result, the forward-backward relation as to the background object and the moving object can not be met with the actual movement.

SUMMARY OF THE INVENTION

It is therefore an object of the present invention to provide an image creating apparatus which is capable of creating images utilizable for three-dimensional display with reality by providing depth data to each dot constituting for pixels (picture elements) for background objects being displayed on a display, when background objects are displayed depending upon three-dimensional data for representing the object constituted by of a plurality of polygons.

It is another object of the present invention to provide an image creating apparatus which is capable of creating images utilizable for realistic three-dimensional display by providing depth data to each dot constituting for background objects and pixels being displayed on a display when the background object and the moving object are synthetically displayed depending upon three-dimensional data for representing the object constituted by a plurality of polygons.

It is further object of the present invention to provide an image display apparatus effective for realistic three-dimensional display by providing depth data to each dot constituting for pixels for background objects to be displayed on a display where background objects are displayed based on three-dimensional data for representing the object constituted by a plurality of polygons.

It is still another object of the present invention to provide an image creating apparatus and/or an image display apparatus that are free from overburdening or overloading on the CPU even where there are a number of objects existing in the three-dimensional space for being displayed.

An image crating apparatus according to the present invention is adapted to create an image constituted by gathering of dots for a plurality of scenes visually perceived as viewed in three-dimensional different two or more directions from a certain view point existing in a three-dimensional space, the apparatus comprising: a polygon image data generating means for generating polygon image data constituted by three-dimensional data and texture data so as to represent, for each polygon, an object existing in the three-dimensional space by a plurality of polygons; a color data storing means having a storing capacity corresponding to the number of the dots for a plurality of background scenes, to temporarily store color data on each background scene on a dot-by-dot basis; a depth data storing means having a storing capacity corresponding to the number of the dots for the plurality of the background scenes, to temporarily store depth data on the background scene on a dot-by-dot basis; a color data writing means for converting into dot image data the polygon image data obtained upon being directed in different two or more directions in the three-dimensional space at the certain view point, to write the color data on the dot-by-dot basis into a corresponding storing position of the color data storing means depending upon the texture data of the polygon; and a depth data writing means for determining, by computation, the depth data on the dot depending upon the three-dimensional coordinate data of the polygon when converting into the dot image data the polygon image data obtained upon being directed in the different two or more directions in the three-dimensional space at the certain view point, to write the depth data on the dot-by-dot basis into a corresponding storing position of the color data storing means.

The color data storing means and the depth data storing means respectively have storing capacities for storing, on the dot-by-dot basis, the color data and the depth data of the object existing in the background scene obtained by dividing a 360-degree range through parallel rotation about the view point, the color data writing means writing, on the dot-by-dot basis, the color data on the object existing in the divided background scene into a corresponding storing position of the color data storing means to the background scene, and the depth data writing means writing, on the dot-by-dot basis, the depth data on the object existing in the divided background scene into a corresponding storing position of the depth data storing means to the background scene.

The color data storing means and the depth data storing means respectively have storing areas of six faces for the background scenes, and the color data writing means and the depth data writing means respectively writing the color data and the depth data into a corresponding face of the six faces, on the left, right, front, rear, upper and lower, as viewed from the view point, in the color data storing means and the depth data storing means at a storing position corresponding to the dot of the object.

The polygon image data generating means includes a first polygon image data generating means for generating background polygon image data constituted by three-dimensional coordinate data and texture data on the polygon for the background object in order to represent by the plurality of the polygons the background object existing in the three-dimensional space, a second polygon image data generating means for generating moving polygon image data constituted by three-dimensional coordinate data and texture data on the polygon for the moving object to be displayed in order to synthesize the moving object with the background polygon image generated by the first polygon image data generating means and represent the moving object by the plurality of the polygons, wherein the color data writing means converts the background polygon image data for the background object generated by the first polygon image data generating means into dot image data for the background object, and the polygon image data for the moving object generated by the second polygon image data generating means into dot image data for the moving object, and writes color data on one of the background object and the moving object which is closer to the view point into the corresponding storing position of the color data storing means depending upon the respective depth data of the background polygon and the moving object polygon, and the depth data writing means writing the depth data of the one of the background object and the moving object which is closer to the view point into the storing position corresponding to the depth data depending upon the depth data of the background object polygon and the moving object polygon when the color data writing means writes the color data of the background object polygon and the moving object polygon into the corresponding storing position of the color data storing means.

An image display apparatus according to the present invention is adapted to display on a raster scan display means the image, and further comprises a reading means for reading the color data written in the color data storing means in synchronism with raster scanning over the raster scan display.

According to the present invention, various objects, such as background objects and/or moving objects depicted by polygons, can be represented by a variety of combinations of overlapping manners in the three-dimensional space where the background objects and/or the moving objects are present, thus realizing realistic image representation.

According to the embodiments of the present invention, visual effects are exhibited in a manner just like the processing, in real time, of all the polygons in the three-dimensional space. Moreover, if the polygons for a multiplicity of objects to be displayed by a plurality of background scenes around the camera position are converted beforehand into the color data on a dot-by-dot basis, there is obtained an advantage that the processing is possible without lowering the capability of image processing, even if the number of objects to be represented by polygons is considerably increased.

Furthermore, even where the moving object is displayed by the combination with the background scene, since the representation is possible for the forward-backward relations to the background object depicted in the background scene and the moving object, there is further provided and an advantage that the representation of the moving object can be displayed as if it was entering into a picture book to move around therein.

In addition, since the background scene is provided with depth data for each dot, it is possible to designate the forward-backward relation to the dots between the background scene and the moving object, offering an advantage of more realistic three-dimensional image representation.

The above described objects and other objects, features, aspects, and advantages of the present invention will become more apparent from the following detailed description of the present invention when taken in conjunction with the accompanying drawings.

BRIEF DESCRIPTION OF THE DRAWINGS

FIG. 1 is a view showing one example of an on-screen space where background objects and a moving object are displayed by an prior art;

FIG. 18 is a flowchart for explaining the operation of combining the moving object with the background image;

DETAILED DESCRIPTION OF THE PREFERRED EMBODIMENTS

Figure 3:
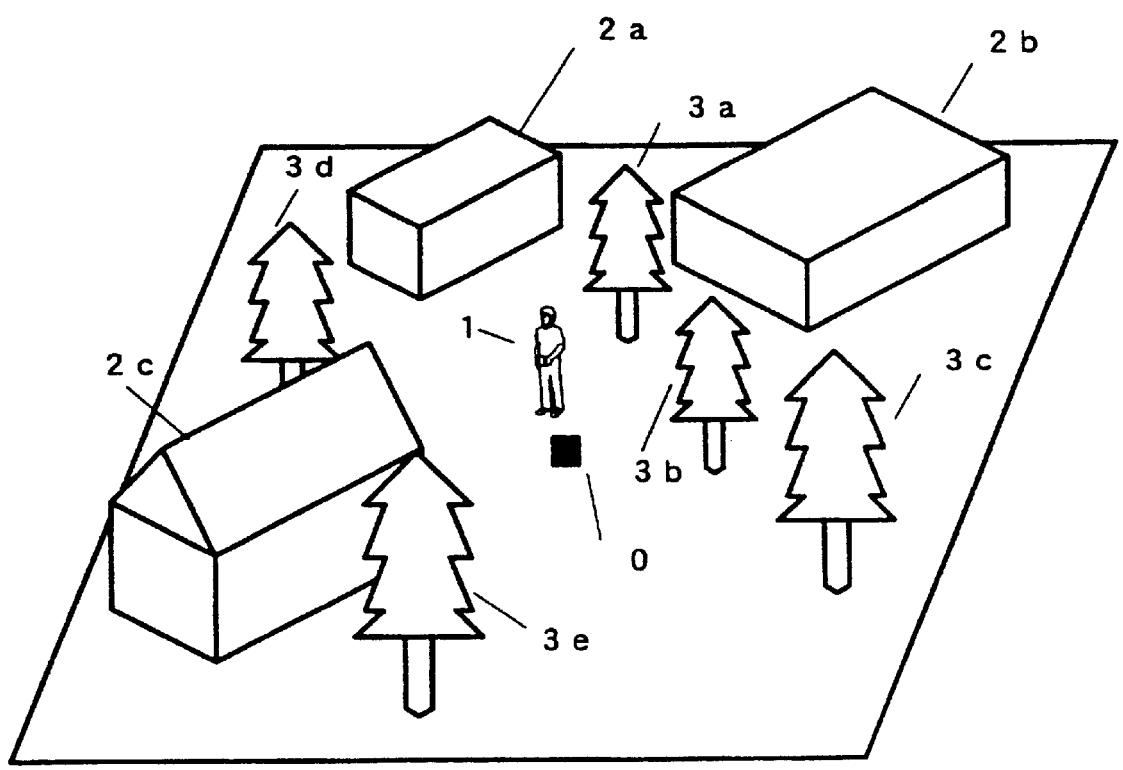
FIG. 3 is a perspective view showing one example of an object (three-dimensional) space for explaining the principle of this invention.

FIG. 3 is a perspective view illustrating an object space (three-dimensional space) as one example for explaining the principle of the present invention. A moving object 1 is an object that moves in a three-dimensional space depending upon the data supplied from a controller 40 (in FIG. 4 hereinafter stated) manipulated by an operator (player). This may be a hero character, animal, automobile (or opponent character and ally character as viewed relative to the hero character) or the like. Background objects may be various objects involving foregrounds such as buildings 2a–2c and trees 3a–3e that are displayed stationary at a given coordinate position according to a program, and a background such as a mountain, sea and clouds and the like, as the game type and/or the scene may be. These background objects are gathered in plurality of number to constitute a background scene.

The display of a composite or synthetical image of background objects and/or moving objects, which is to be displayed on the display during playing a game, is carried out by generating data of images that would be taken by a hypothetical camera located at a view point O with respect to a hero, etc. for example, so that the background object and/or the moving object existing in a limited hypothetical three-dimensional space are taken by the camera directed in a certain direction and rotated in parallel by 360 degrees.

Specifically, the background objects are each constituted by gathering of a plurality of polygons. Each polygon is defined by three-dimensional coordinate data (X, Y, Z coordinate data), and texture data for determining the textures affixed to polygon faces to represent colors, patterns, material feelings, etc. The view point O (or the hypothetical camera photographing position) and the direction of camera eye (the photographing direction by the hypothetical camera) are varied depending upon operational data generated upon operation of the controller by the operator. The hypothetical camera takes a photograph for the background object and/or the moving object with reference to the view point and the direction of camera eye. The three-dimensional coordinate data on the polygons for the background object (or the background object and the moving object) to be projected in the three-dimensional space upon photographing by the hypothetical camera is determined by computation and subjected to texture mapping for each polygon, thereby forming a three-dimensional image. The image data on each dot in the three-dimensional space is written into a buffer memory (RAM 15 shown in FIG. 5), hereinafter stated, based on the polygon three-dimensional coordinate data and texture data, thus obtaining image data for display. In the embodiment of the present invention, the formation of image data is realized by using the image buffer for storing color data on a dot-by-dot basis, and the Z buffer for storing depth data on a dot-by-dot basis. The detailed operation of the same will be described later.

Figure 4:
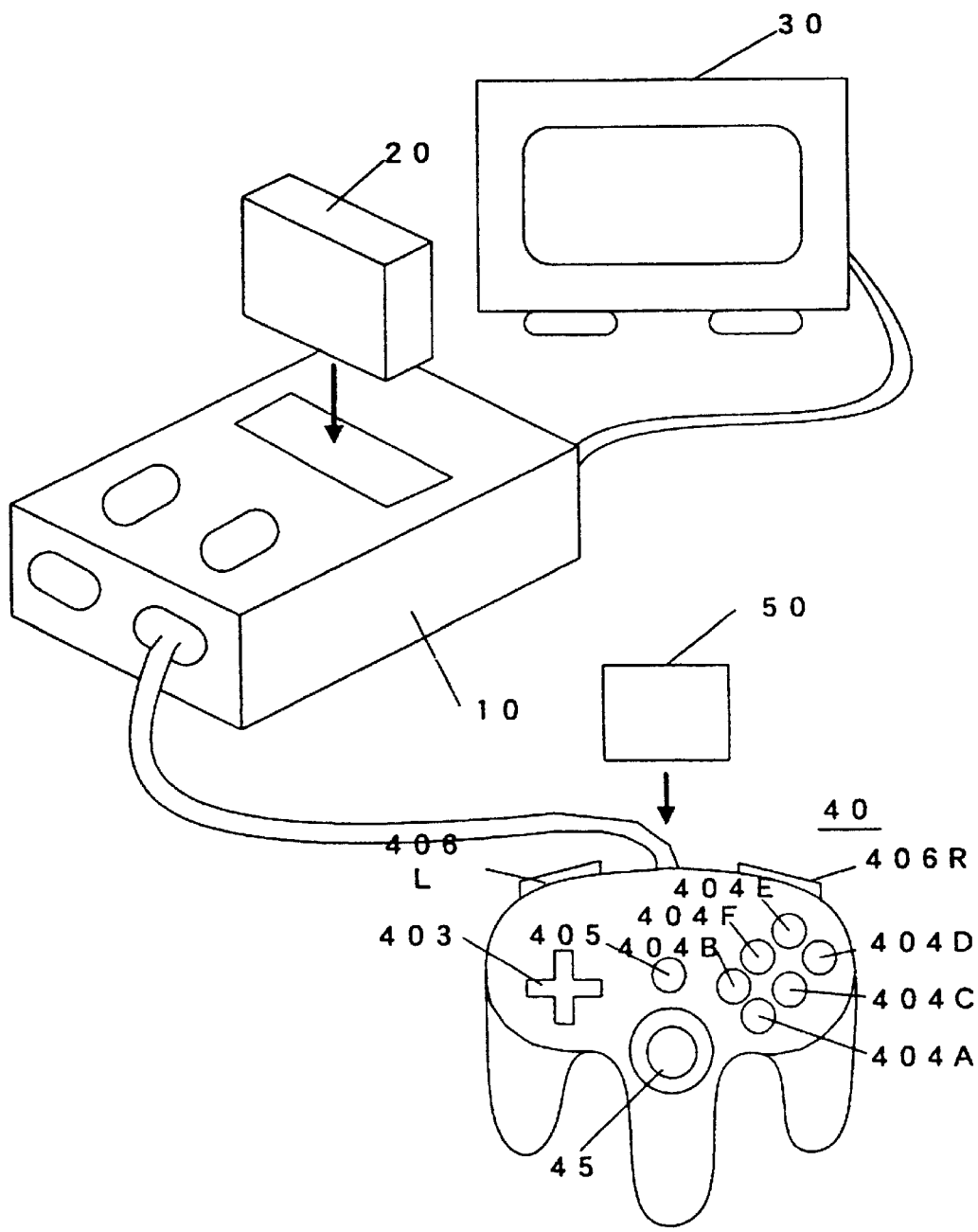
FIG. 4 is an external view showing a system configuration of an image processing apparatus according to one embodiment of the present invention.

Now explanations will be made for an image processing system as one example of the image creating apparatus and/or the image display apparatus according to the present invention. FIG. 4 is an external view showing a system structure of the image processing apparatus according to one embodiment of the invention. The image processing system is for example a video game system, and includes an image processing apparatus main body 10, an ROM cartridge 20 as one example of an external memory device, a CRT display 30 as one example of a display means to be connected to the image processing apparatus main body 10, a controller 40 as one example of an operating means, and an RAM cartridge 50 as one example of an extension device detachably attached to the controller 40. Incidentally, the operating means may employ an input device such as a keyboard, mouse, etc. where the image creating apparatus of the present invention is applied to a personal computer.

Figure 5:
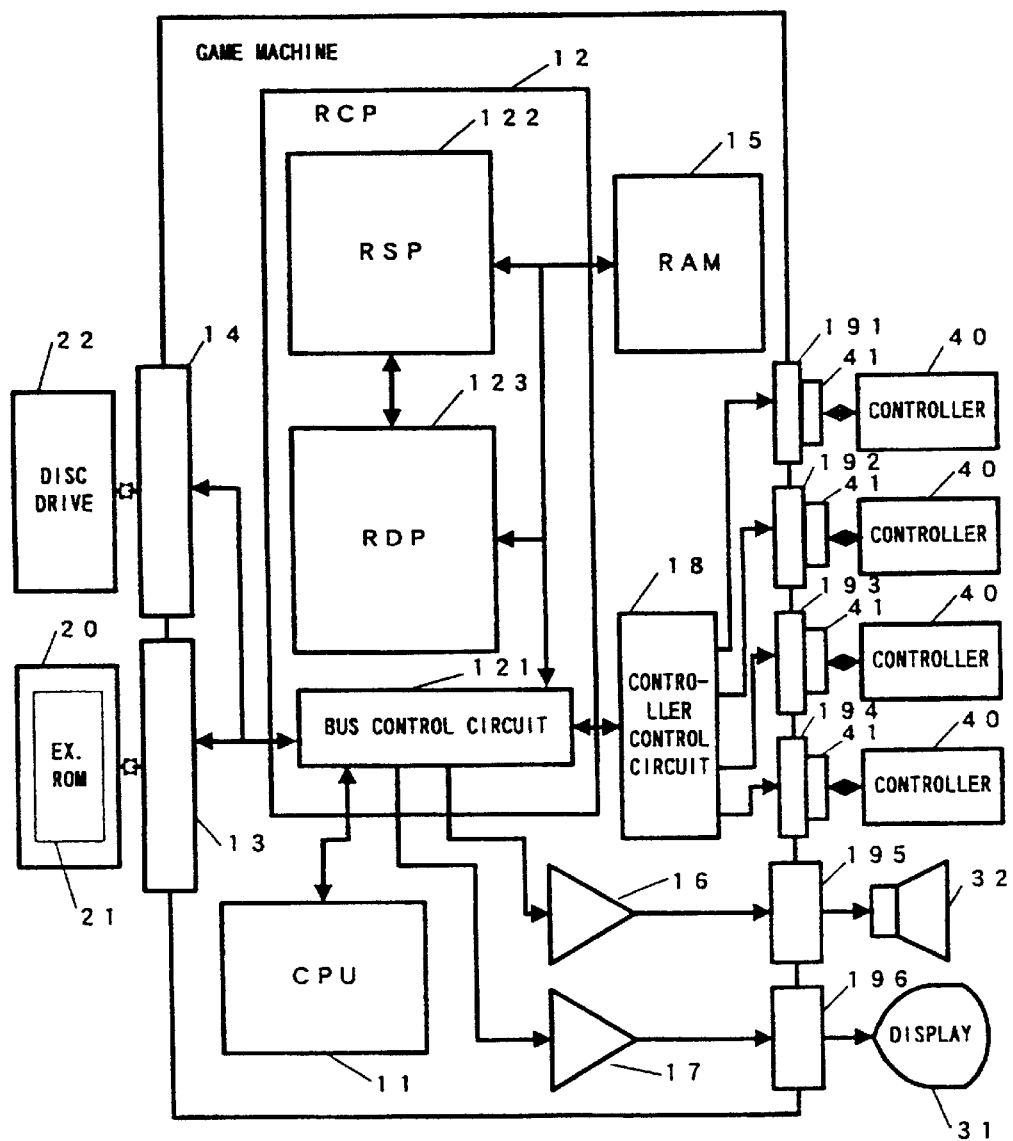
FIG. 5 is a block diagram of the image processing apparatus according to the one embodiment of the present invention.

FIG. 5 is a block diagram of the image processing apparatus as one embodiment of this invention. The image processing apparatus 10 incorporates therein a central processing unit (hereinafter abbreviated as "CPU") 11 and a coprocessor (reality media coprocessor: hereinafter abbreviated as "RCP") 12. The RCP 12 includes an image processing unit (reality signal processor; hereinafter abbreviated as "RSP") 122 for carrying out coordinate transformation and shading for the polygon, an image processing unit (reality display processor; hereinafter abbreviated as "RDP") 123 for rasterizing the polygon data into an image to be displayed and converting it into a data format (dot data) memorable by a frame memory, and a bus control circuit 121 for controlling the bus. The RCP 12 is connected with a cartridge connector 13 for detachably mounting the ROM cartridge 20 thereon, a disc drive connector 14 for detachably attaching a disc drive 22, and a RAM 15. The RCP 12 is also connected with an audio signal generating circuit 16 for outputting audio signals processed by the CPU 11 and an image signal generating circuit 17 for outputting video signals processed by the same. Furthermore, the RCP 12 is connected with a controller control circuit 18 for serially transferring operational data on one or a plurality of controllers 40 and/or data on RAM cartridge 50.

The audio signal generating circuit 16 is connected with a connector 195 provided at the rear face of the image processing apparatus 10. The image signal generating circuit 17 is connected with a connector 196 provided at the rear face of the image processing apparatus 10. The connector 195 is dismountably connected with a connecting portion of a sound generating device 32 such as a TV speaker, or the like. The connector 196 is dismountably connected with a connecting portion of a display 31 such as a TV CRT or the like. Incidentally, although in the FIG. 5 example there is shown a case that the connector 195 and the connector 196 are separately provided from each other, they may be formed in one single connector having the number of terminals for both connectors 195 and 196.

The controller control circuit 18 is connected with controller connectors (hereinafter abbreviated as "connector") 191–194 provided at the front face of the image processing apparatus 10. The connector 191–194 is detachably connected with the controller 40 through a connecting jack 41. The connection of the connector 191–194 with the controller 40 in this manner places the controller 40 into electrical connection to the image processing apparatus 10, thereby enabling data transmission and reception therebetween.

The ROM cartridge 20 is structured by mounting on a board an external ROM 21 stored with data for processing a game, wherein the board is accommodated within a housing. The external ROM 21 is stored with image data for image processing for a game, etc. or program data, and, as required, audio data such as music sounds or effect sounds and so on. Incidentally, various memory mediums such as CD-ROMs and magnetic disc may be used as the external memory device, in place of the ROM cartridge 20.

Figure 6:
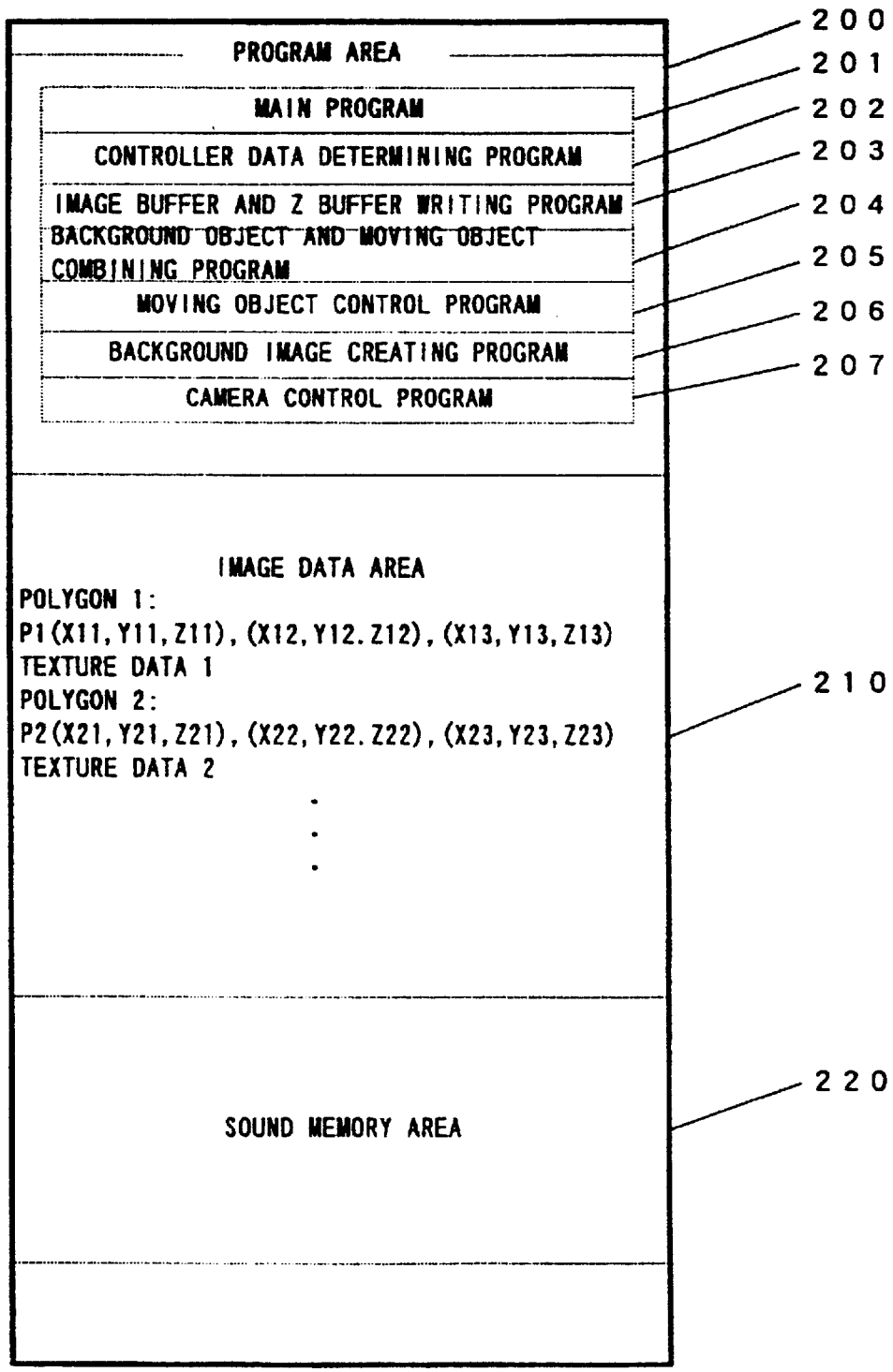
FIG. 6 is a memory map illustratively showing memory spaces in an external ROM 21.

The external ROM 21 has roughly a program memory area 200, an image data area 210 and a sound memory area 220, as shown in FIG. 6, to previously store with various programs in a fixed manner. The program memory area 200 is stored with programs (e.g. a control program for achieving the function of flowcharts in FIG. 10, FIG. 14, FIG. 16, FIG. 17 and FIG. 18 referred to later, and a game program conforming to the consent of a game, etc.) required for carrying out image processing for a game or the like. The detail of the program will be hereinafter referred to. The image data area 210 is stored with image data including coordinate data on a plurality of polygons and texture data on each of the background objects and/or the moving object. The sound memory area 220 is stored with sound data such as effect sounds, musics, etc. for use in a game or the like.

Specifically, the program area 200 includes program areas 201–207 for previously memorize operational programs for the CPU 11 in a fixed manner. That is, a main program area 201 is stored with main program data for a game, etc. An operational state determining program memorizing area 202 is stored with a program for processing data indicative of an operating state, etc. of the controller 40. A writing program memorizing area 203 is stored with a writing program by which the CPU 11 causes the RCP 12 to perform writing operation. That is, the area is stored for example with a writing program for writing color data into an image buffer area (152 shown in FIG. 7) and depth data into a Z buffer area (153 in FIG. 7) as image data based on texture data of a plurality of background objects to be displayed in one background scene, a writing program for writing into the image buffer area (152) color data corresponding to any of the background scenes of the areas 1–6 in a background image buffer area 154, and a writing program for writing into the Z buffer area (153 depth data corresponding to any of the background scenes of the areas 1–6 in a background Z buffer area 155. A combining program memorizing area 204 is stored with a composite program by which the CPU causes the RCP 12 to combine the background object with the moving object. A moving control program memorizing area 205 is stored with a control program by which the CPU 11 causes the RCP 12 to vary the location of the moving object in the three-dimensional space. A background scene creating program memorizing area 206 is stored with a background picture creating program by which the CPU 11 causes the RCP 12 to create an all-directional background picture. A camera control program memorizing area 207 is stored with a camera control program by which the CPU 11 causes the RCP 12 to control the location and direction of photographing in the three-dimensional space by the hypothetical camera (or for determining a background scene to be read into the object space).

The disc drive 22 is used in place of the ROM cartridge 20 or in addition to the ROM cartridge 20. The disc drive 22 is a record reproducing device for reading data out of an optical-type or magnetic disc form memory medium that is stored with various data (including program data and image processing data) for a game. When a magnetic disc or the like is attached to, the disc drive 22 reads out the data memorized on the magnetic disc and transfers the data to the RAM 15.

Figure 7:
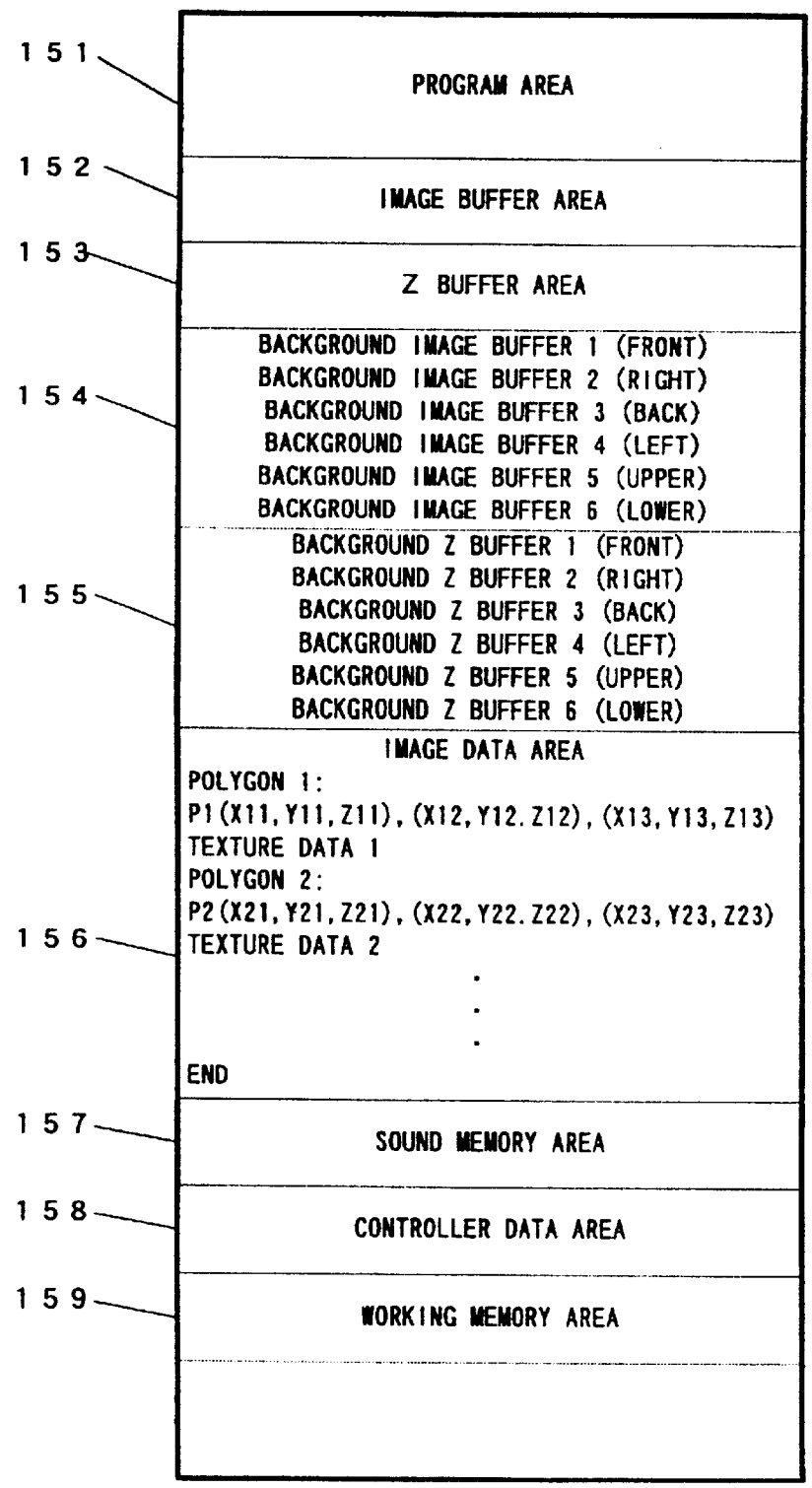
FIG. 7 is a memory map illustratively showing memory spaces in a RAM 15.

FIG. 7 is a memory map for the RAM 15, illustratively showing memorizing areas thereof. The RAM 15 includes a program area 151, an image buffer area 152, a Z buffer area 153, a background image buffer area 154 as one example of a color data storing means, a background Z buffer area 155 as one example of a depth data storing means, an image data area 156, a sound memory area 157, an operating state data storing area 158, and an operating (working) memory area 159. The areas 151–159 of the RAM 15 are memory spaces which are accessible by the CPU through the bus control circuit 121 or by the RCP 12 directly, which have an arbitrary capacity (or memory space) assigned depending upon the game used.

Specifically, the program area 151 is to memorize, by transferring thereto, part of the program for a game, etc. stored in the ROM cartridge 20. The image buffer area 152 has a memory capacity corresponding to the number of picture elements (pixels or dots) on the display 31×the number of bits of color data per picture element, so that it memorizes color data on a dot-by-dot basis in a manner corresponding to the picture element on the display 31. This image buffer area 152, in an image processing mode, temporarily stores with dot color data on an object viewed from the view point, based on the three-dimensional coordinate data for representing in gathering of polygons for one or more background objects and/or moving objects to be displayed in one background scene memorized by the image data area 156. The image buffer area 152, in a display mode, temporarily stores with color data on a dot-by-dot basis for any of the planes of the background scene memorized in the background image buffer area 154, when the plane of the background scene is displayed. The Z buffer area 153 has a memory capacity corresponding to the number of picture elements (pixels or dots) on the display 31×the number of bits of depth data, so that it memorizes depth data on a bit-by-bit basis in a manner corresponding to the picture element on the display 31. This Z buffer area 153, in the image processing mode, temporarily stores with depth data on a dot-by-dot basis for an object that can be seen from the view point, based on the three-dimensional coordinate data for representing in gathering of polygons for one or more background objects and/or the moving objects, in a manner similar to the image buffer area 152. The Z buffer area 153, in the display mode, temporarily stores with depth data on a dot-by-dot basis for any plane of the background scene stored in the background Z buffer area 155. The background image buffer area 154 and the background Z buffer area 155 have respective memory capacities for storing with color data and depth data of 6 planes of background images that are obtained by dividing a range of 360 degrees over which the hypothetical camera is parallel moved from the view point into a plurality of scenes (e.g. 4 scenes of the front, rear, left and right), together with the upper plane and a lower plane (bottom plane), to have memory sites (addresses) corresponding to the number of screen picture elements (or the number of dots) for each plane of the background scene. The background image buffer area 154 memorizes, as a background image, color data on a dot-by-dot basis for the background scene (image created by the RSP 122 and the RDP 123 included in the RCP 12) to be projected through photographing by the hypothetical camera directed in a certain direction in the three-dimensional space. The background Z buffer area 155 memorizes depth data on a dot-by-dot basis constituting the background image correspondingly to the color data memorized by the background image buffer area 154. The image data area 156 memorizes coordinate data and texture data constituted by gathering of polygons for each object of the background objects and/or moving objects for display a game stored by the ROM cartridge 20, so that at least one screen of data is transferred thereto from the ROM cartridge 20 prior to image processing operations. The sound memory area 157 is transferred with audio data stored in the ROM cartridge 20, memorizing audio data of the sound to be generated through the sound generating device 32. The operating state data storing area 158 memorizes operating state data indicative of a state of operation that is read out of the controller 40. The working memory area 159 temporarily memorizes data such as parameters upon executing a program by the CPU 11.

The bus control circuit 121 included in the RCP 12 parallel-serial converts a command given in a parallel signal form via the bus from the CPU 11, so that the same command is supplied as a serial signal to the controller control circuit 18. The bus control circuit 121 converts a serial signal inputted from the controller control circuit 18 into a parallel signal, to output the same signal via the bus to the CPU 11. The data, read from the controller 40 and representative of a state of scanning, is subjected to processing, i.e. processed by the CPU 11 and written into the RAM 15 for temporary storage. In other words, the RAM 15 includes a storing area for temporarily storing the data to be processed by the CPU 11, so that it is utilized for smoothening the reading and writing of data through the bus control circuit 121.

Figure 8:
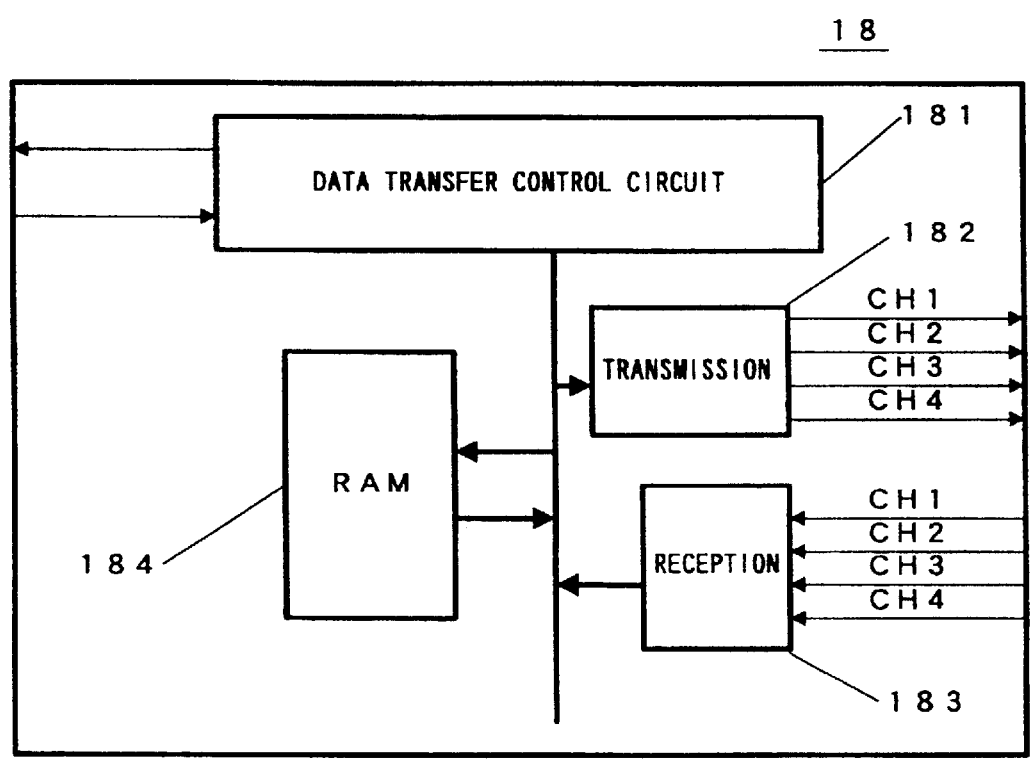
FIG. 8 is a detailed circuit diagram of a controller control circuit 18.

FIG. 8 is a detailed circuit diagram of the controller control circuit 18. The controller control circuit 18 is provided to transmit and receive data in serial between the RCP 12 and the controller connectors 191–194, so that it includes a data transfer control circuit 181, a transmitting circuit 182, a receiving circuit 183 and a RAM 184 for temporarily storing transmitting and received data. The data transfer control circuit 181 includes a parallel-serial converting circuit and a serial-parallel converting circuit for converting data formats during data transfer, to perform control on writing into and reading out of the RAM 184. The serial-parallel converting circuit converts the serial data supplied from the RCP 12 into parallel data to be delivered to the RAM 184 or the transmitting circuit 182. The parallel-serial converting circuit converts the parallel data supplied from the RAM 184 or the receiving circuit 183 into serial data to be delivered to the RCP 12. The transmitting circuit 182 converts into serial data a command for controlling the reading of a controller 40 signal supplied from the data transfer control circuit 181 as well as writing data (parallel data) into the RAM cartridge 50, and delivers these data to channels CH1–CH4 corresponding respectively to a plurality of the controllers 40. The receiving circuit 183 receives in serial the data representative of operating state of the controllers 40 inputted through the channels CH1–CH4 respectively corresponding to a plurality of the controllers 40, and converts the data into parallel data to be delivered to the data transfer control circuit 181. The data transfer control circuit 181 controls the writing into the RAM 184 for the data transferred from the RCP 12, the operating state data on the controller 40 received by the receiving circuit 183 or the data read out of the RAM cartridge 50, and operates to read data out of the RAM 184 to transfer the same to the RCP 12 depending upon instructions from the RCP 12.

The RAM 184 includes memory areas 184a–184h, omittedly shown. The area 184a is stored with a command for the first channel, while the area 184b is stored with transmission data and reception data for the first channel. Similarly, the area 184c is stored with a command for the second channel, while the area 184d is stored with transmission data and reception data for the second channel. The area 184e is stored with a command for the third channel, and the area 184f is stored with transmission data and reception data for the third channel. The area 184g is stored with a command for the fourth channel, and the area 184h is stored with transmission data and reception data for the fourth channel.

Figure 9:
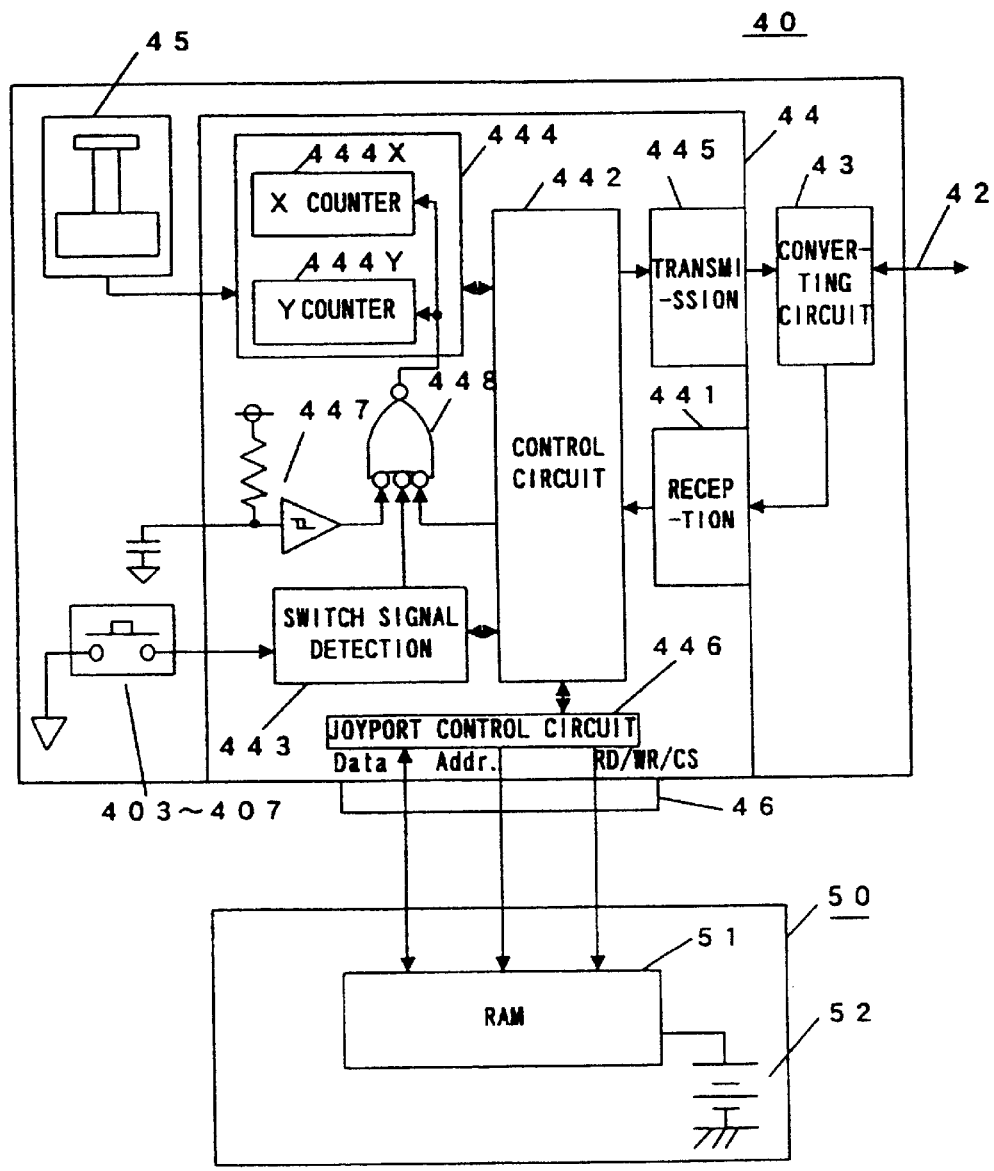
FIG. 9 is a block diagram of a controller 40.

FIG. 9 is a detailed circuit diagram of the controller 40 and the RAM cartridge 50 as one example of an extension device. The controller 40 has a housing incorporating therein electronic circuits such as an operating signal processing circuit 44, in order to detect operating states of switches 403–407 or a joystick 45, etc. and transfer the detected data to the controller control circuit.

The operating signal processing circuit 44 includes a receiving circuit 441, a control circuit 442, a switch signal detecting circuit 440, a counter circuit 444, a joyport control circuit 446, a reset circuit 447 and a NOR gate 448. The receiving circuit 441 converts serial signals, such as the control signal, transmitted from the controller control circuit 18 and writing data to the RAM cartridge 50 into a parallel signal, delivering the same to the control circuit 442. When the control signal transmitted from the controller control circuit 18 is a signal to reset X, Y coordinates for the joystick 45, the control circuit 442 generates a reset signal to reset (0) the count values of an X-axis counter 444X and a Y-axis counter 444Y within the counter 444 via the NOR gate.

The joystick 45 includes X-axis and Y-axis photo-interrupters in order to decompose the inclination of the lever into X-axis and Y-axis direction components to generate pulses in number proportional to the inclination, to deliver respective pulse signals to the counter 444X and the counter 444Y. When the joystick 45 is inclined in the X-axis direction, the counter 444X counts the number of pulses generated in response to the magnitude of inclination. When the joystick 45 is inclined in the Y-axis direction, the counter 444Y counts the number of pulses generated responsive to the amount of inclination. Accordingly, the moving direction and the coordinate position for a hero character or a cursor are determined by a resultant vector of the X-axis and Y-axis components that are determined by the count values of the counter 444X and the counter 444Y. Incidentally, the counter 444X and the counter 444Y are reset of their count values by a reset signal supplied from a reset signal generating circuit 447 upon turning on the power or a reset signal supplied from a switch signal detecting circuit when predetermined two switches are simultaneously depressed by a player.

The switch signal detecting circuit 443 responds to an output command signal on a switch state supplied at a constant period (e.g. at an interval of 1/30 seconds of a TV frame period) from the control circuit 442, to read thereinto a signal depending upon the state of depressions of a cross switch 403, switches 404A–404F, 405, 406L, 406R and 407, delivering the same to the control circuit 442. The control circuit 442 responds to a readout command signal for the operating state data from the controller control circuit 18, to supply operating state data concerning the switches 403–407 and the count values of the counters 444X, 444Y to the transmitting circuit 445 in a predetermined data format sequence. The transmitting circuit 445 converts these parallel signals outputted from the control circuit 442 into serial data, to transfer the same data to the controller control circuit 18 via a converting circuit 43 and a signal line 42. The control circuit 442 is connected with a port control circuit 446 via an address bus and a data bus as well as a port connector 46. The port control circuit 446 controls on data inputting and outputting (or transmission and reception control) according to instructions by the CPU 11, when the RAM cartridge 50 is connected to the port connector 46.

The RAM cartridge 50 has the RAM 51 connected to the address bus and the data bus, and connected to an electric for supplying power to the RAM 51. The RAM 51 is a RAM having a capacity less than a half of the maximum memory capacity accessible using the address bus, and formed for example by a 256 k-bit RAM. The RAM 51 stores with backup data concerning a game so that it keeps data storage due to supply of power from the cell 52 even if the RAM cartridge 50 is removed off from the port connector 46.

Figure 10:
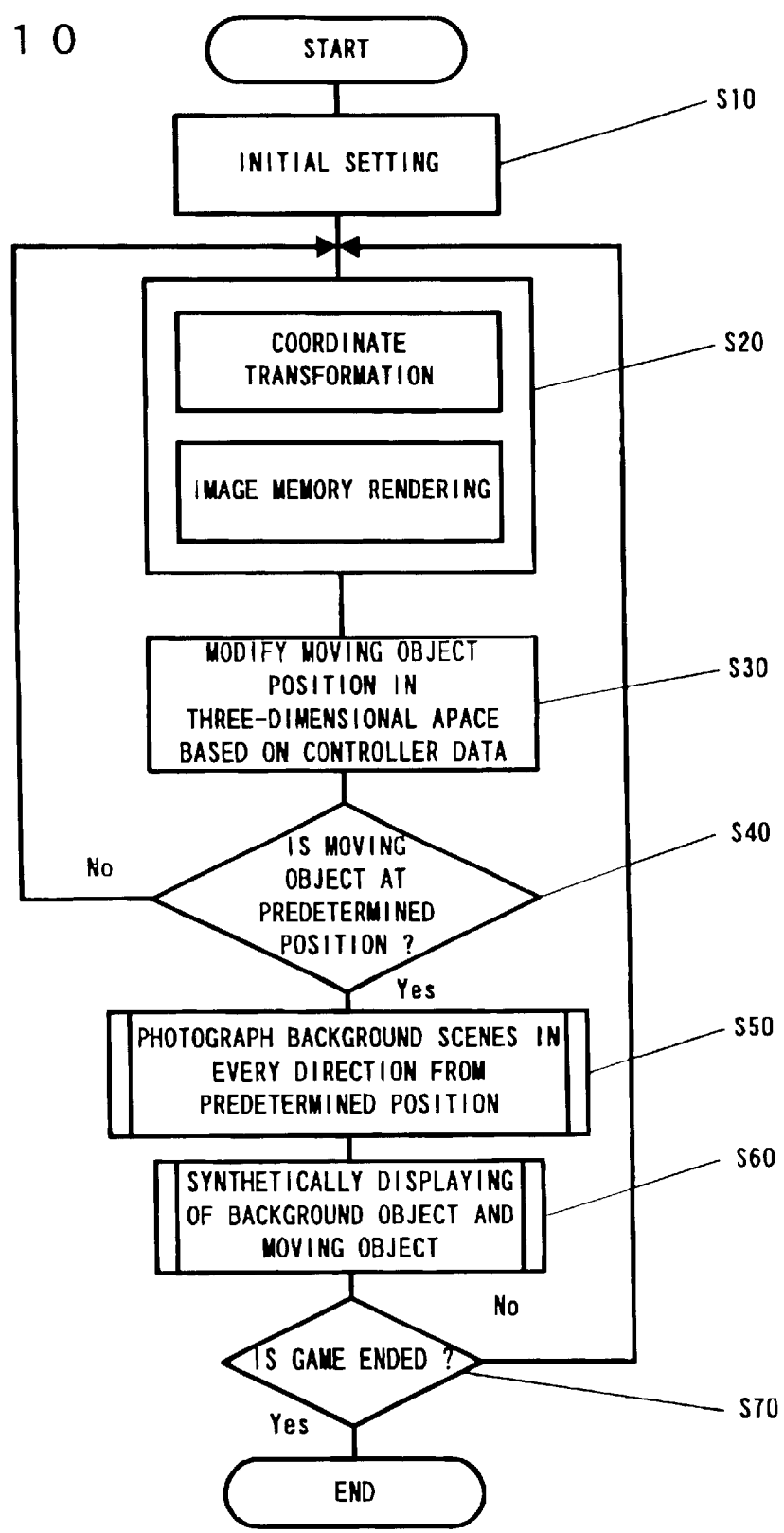
FIG. 10 is a main flowchart for game processing.

FIG. 10 is a flowchart showing a principal operation of the video game apparatus as one example according to the present invention. At a step (in the figure "S" is affixedly shown) 10, the CPU 11 performs initial setting to set the image processing apparatus 10, in a state immediately after turning on the power, to a predetermined initial state. For example, of the game programs memorize in the program areas of the ROM cartridge 20, a predetermined game program is transferred to the program area 151 of the RAM 15, and the parameters are set to their initial values.

At a step 20, the RSP 122 performs coordinate transforming processing under the control of the CPU 11, based on coordinate data and texture data on polygons for each object stored in the image data area 156 of the RAM 15.

Figure 11:
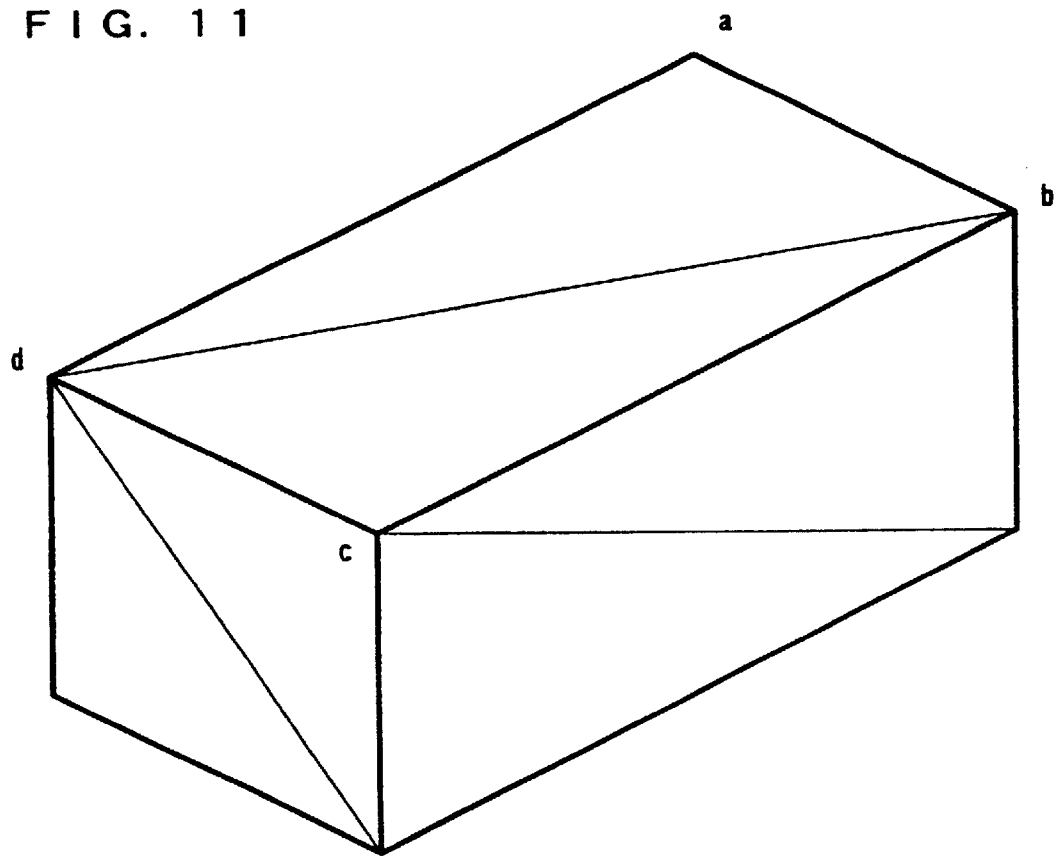
FIG. 11 is an external perspective diagram for a case that a building as one example of a background object is represented by polygons.
Figure 12:
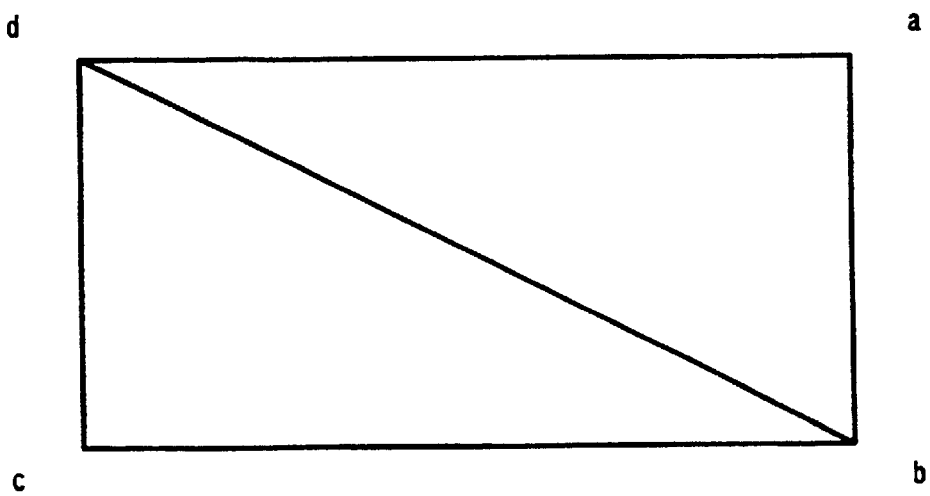
FIG. 12 is a plan diagram the composingly showing the polygons constituting certain one of the building as the one example of the background object.

First explanations will be made in detail for the case that the RSP 122 performs coordinate transformation for the polygon. FIG. 11 is a diagram representing a building as one of the background objects in FIG. 3. The building 2 is in a cubic form formed by six trapezium faces. Each of the trapeziums is divided into two triangles, i.e. triangles abd and bcd. The coordinates at three apex of the triangle are numerical data represented by polygon three-dimensional coordinate data P1(X1, Y1, Z1), P2(X2, Y2, Z2), and P3(X3, Y3, Z3). In a similar manner, the moving object 1 operable by another controller 40 and the background objects representing a building 2 and a tree 3 are also constituted by gathering of a plurality of triangles, each of which is to be represented by polygon coordinate data.

In the meanwhile, the polygon texture data is data for designating on what color, pattern or material feeling is affixed to the inside of a triangle defied by the three-dimensional coordinate data for the polygon. Incidentally, the texture data, if an eye is fixed onto one dot among a gathering of dots existing in a region encompassed by the triangle, will be color data for designating a color.

Figure 13:
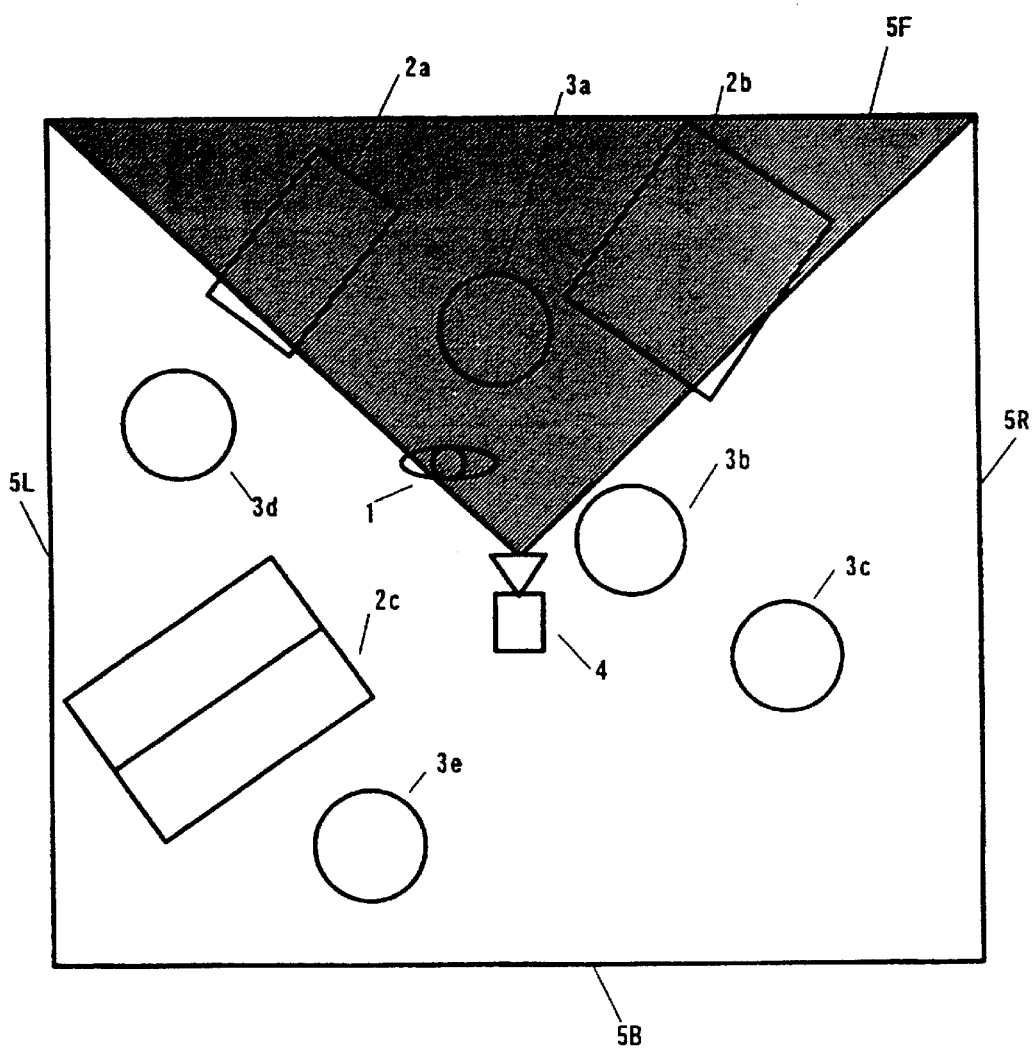
FIG. 13 is a plan view of one-example three-dimensional space, as built from the above, represented by the embodiment of the present invention.

FIG. 13 is a plan view, as viewed from the right above, of the three-dimensional space (object space) shown in FIG. 3. For example, when four planes on the front, rear, left and right, as viewed from a view point O, are photographed by a camera as shown in FIG. 13, it is satisfactory to deal with coordinate data on polygons defining portions opposed to the camera, as to the moving object (hero character) 1, the buildings 2a, 2b and 2d and the tree 3a visible from the camera 4. In this case, it is determined on whether or not each object exists within a range being in sight from the camera 4 position (i.e. whether the polygon for the object should be represented or not). Thereafter, two-dimensional image data is read in as if a hatched portion in sight from the camera 4 was photographed as a foreground scene depending upon the coordinate data of the polygon to be displayed.

Then, the RDP 123 performs image rendering processing with the image buffer and the Z buffer under the control of the CPU 11. This image rendering process involves transformation into color data on a dot-by-dot basis based on the texture data and the two-dimensional data created by the coordinate transformation, determining by competition depth data, writing color data into the image buffer 152, and writing the depth data into the Z buffer 153. By thus carrying out coordinate transformation and image rendering for each polygon, the image to be displayed is created.

Incidentally, a moving object inoperable by the controller 40 may exist in the three-dimensional space, though not shown in FIG. 3. The moving object in this case is displayed as an opponent character or an ally character, simultaneous with the aforesaid hero character, thus being utilized as an object that automatically moves according to a program.

At a step 30, the CPU 11 determines to which direction and how much the joystick is inclined. Based on the result of the determination, the moving object is moved at a speed commensurate with the amount of inclination as to the direction of joystick inclination. This process is achieved by gradually varying the three-dimensional coordinate data for the polygon constituting the moving object in the three-dimensional space, depending upon the count values of the X counter 444X and the Y counter 444Y.

At a step 40, the CPU 11 determines whether or not the moving object exists at a predetermined location in the three-dimensional space. If it is determined that the moving object does not exist at the predetermined location, the process repeats the operations of the steps 20 and 30, while if the moving object exists at the predetermined location is determined the process of a step 50 is executed.

Figure 14:
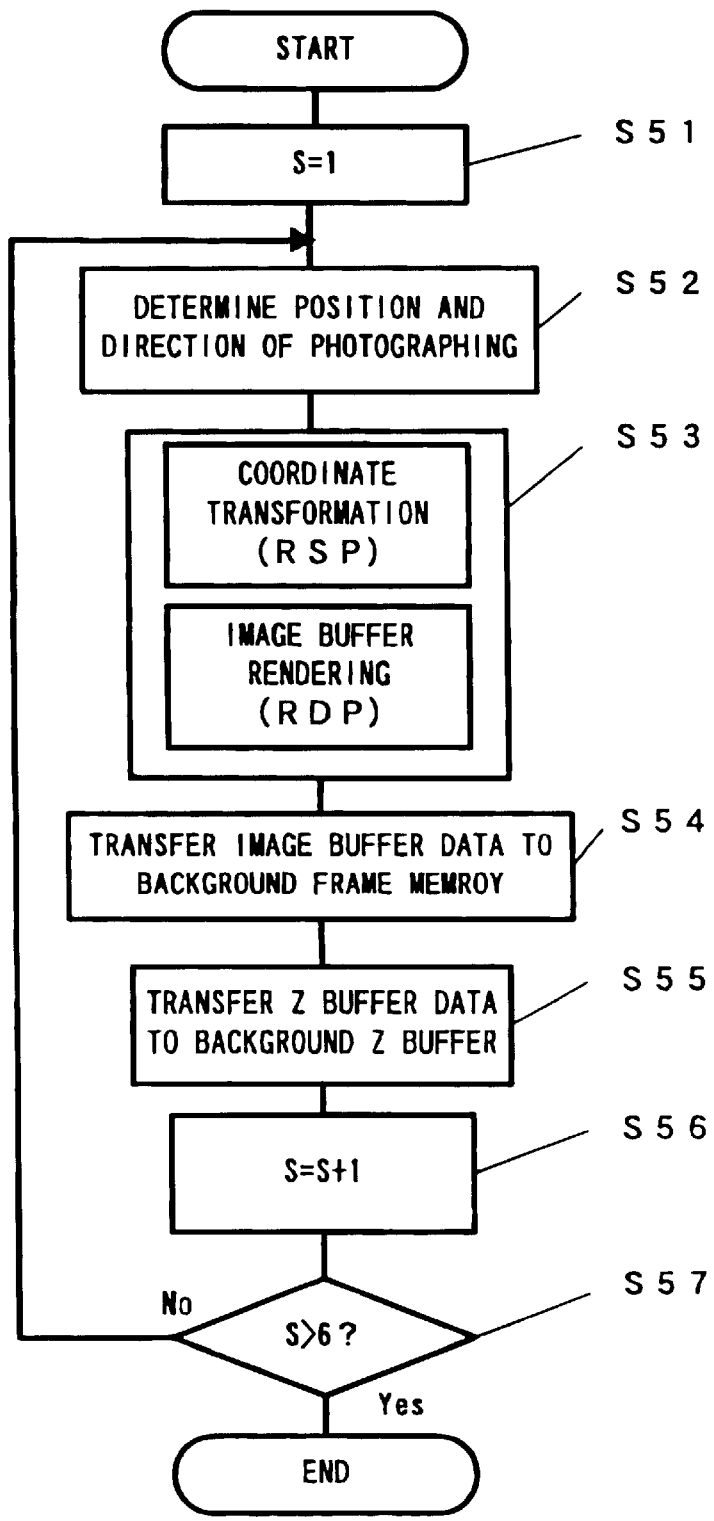
FIG. 14 is a flowchart for a case that background image data is taken as if photographed in six directions by a camera.

At a step 50, the background scenes, in the 6 directions, of on the front, rear, left, and right and the upper and lower are photographed in order from a predetermined photographing position. The detail thereof is given in a subroutine of FIG. 14. With reference to FIG. 14, at a step 51 a variable S representing the number of plane being photographed is set two 1. The variable S is temporarily written into a part of the working memory area 159 of the RAM 15. At a step 52, the location and direction to be photographed (to be written by image data) are determined. The location of photographing is at a position where the moving object has existed at the step 30 or a location convenient for photographing that background scene, which is determined according a game program and in compliance with the situation in the game. The direction of photographing is determined by sequentially setting as to the directions of not yet photographed of the six direction, i.e. the front, rear, left, right, upper and lower, with respect to the point where the moving object exists. At a step S53, the RCP 12 performs similar processing to that of the step 20 in FIG. 10. When the writing of the color data into the memory site corresponding to the dot for the one background scene is completed for all the dots, the CPU transfers at a step 54 the color data on the two-dimensional image created in the image buffer to an area corresponding to the photographed background scene among the areas 1–6 contained in the background image buffer 154, temporarily memorizing the same there. At a step 55, the CPU 11 transfers and writes the depth data on the dot of a certain background scene (e.g. the front scene, at first) created on the Z buffer 153 to an area corresponding to the photographed background scene among a plurality of background Z buffer 154 areas 1–6 (e.g. the area 1 corresponding to the front scene, at first), temporarily memorizing the same there. At a step 56, the CPU 11 increments the variable S by one, and then designates a direction to be photographed. At a subsequent step 57, the CPU 11 determines whether or not the value of the variable S is greater than 6, thereby judging whether the transfer/writing of image data to the 6 planes of the background scene is completed or not.

If the variable S is not greater than 6 (5 or the smaller), the process returns to the step 52 to repeat the steps 52 to 56, thus continuing the similar process until image data have been written for the 6 planes of the background scene. Meanwhile, when the variable S is 6 or the greater is determined, the subroutine of FIG. 14 (step 50) is ended.

When all the processes in the subroutine at the step 50 have been ended in this manner, the background image buffer 154 at its area 1–6 are temporarily stored with color data on each dot of the background images of 6 planes representing the front, rear, left, right, upper and lower as viewed from the photograph position, while the background Z buffer 155 at its areas 1-6 are stored with the depth data on each dot of the background images of 6 planes representing the front, rear, left, right, upper and lower as viewed from the photograph position.

Figure 15:
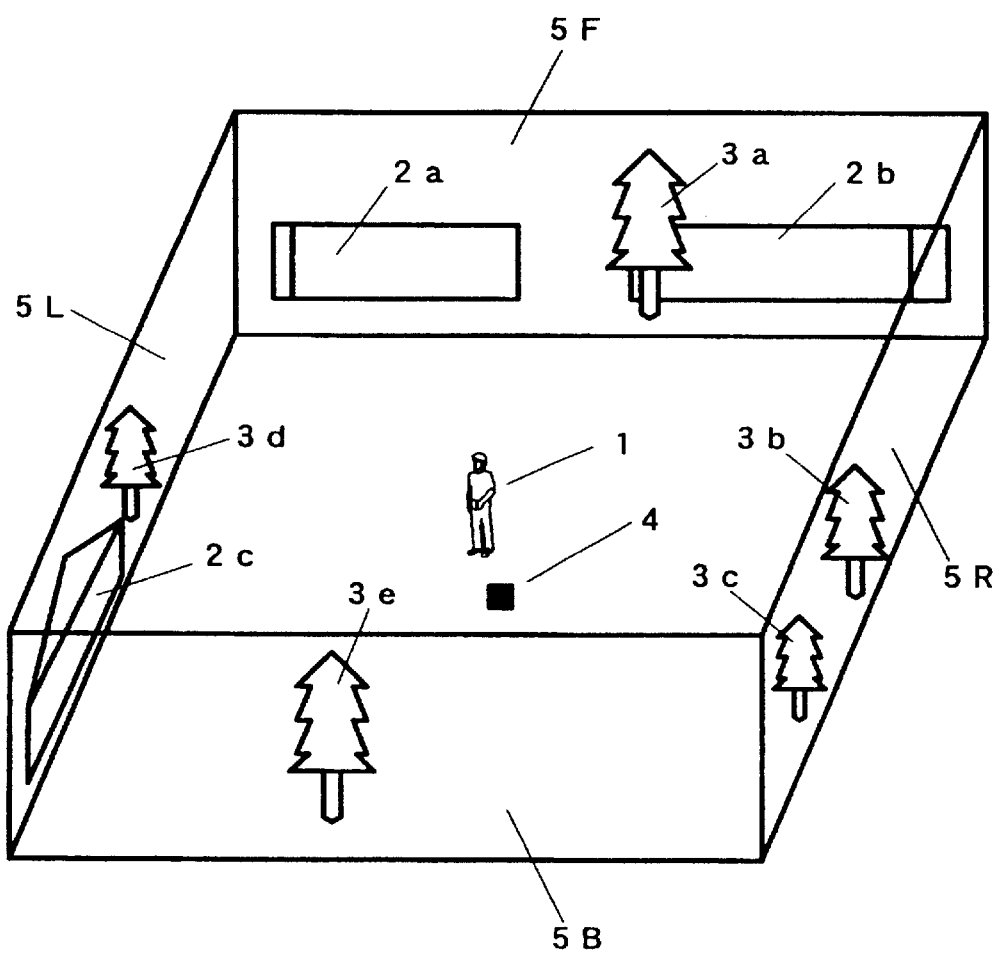
FIG. 15 is a view visually demonstrating a result of transformation of a three-dimensional space into a two-dimensional background images.

In a state that all the processing of the subroutine at the step 50 has been completed, where the color data and the depth data have been created for background scenes, in four directions, of the front, rear, left and right from the photograph position, the sight of the background scenes on the front, rear, left and right with respect to the hero character moving object 1 is equivalent to a three-dimensional background scene as shown in FIG. 15. Explaining in greater detail by referring to FIG. 15, the above sight is equivalent to the background scene 5F put onto the front wall, wherein the scene 5F has been photographed by the camera that is at the view point and directed frontward (forward) in the object space shown in FIG. 3. Similarly, the above sight is equivalent to the background scene 5B photographed by the camera directed rearward is putting onto a rear wall, the background scene SR photographed by the camera directed rightward is put onto a right wall, and the background scene 5R photographed by the camera directed leftward is put onto a left wall. Incidentally, the background scene 5R photographed by the camera directed upward is put onto a ceiling plane, while the background scene 5R photographed by the camera directed downward (toward the bottom) is put onto a lower plane (or floor plane), as similar to the above. In practical image data processing, the color data on each dot constituting these background scenes 5F, 5B, 5R, 5L, 5U, 5 is temporarily written into the area 1—area 6 of the background image buffer 154, and the depth data thereof is temporarily written into the area 1—area 6 of the background Z buffer 155.

Figure 16:
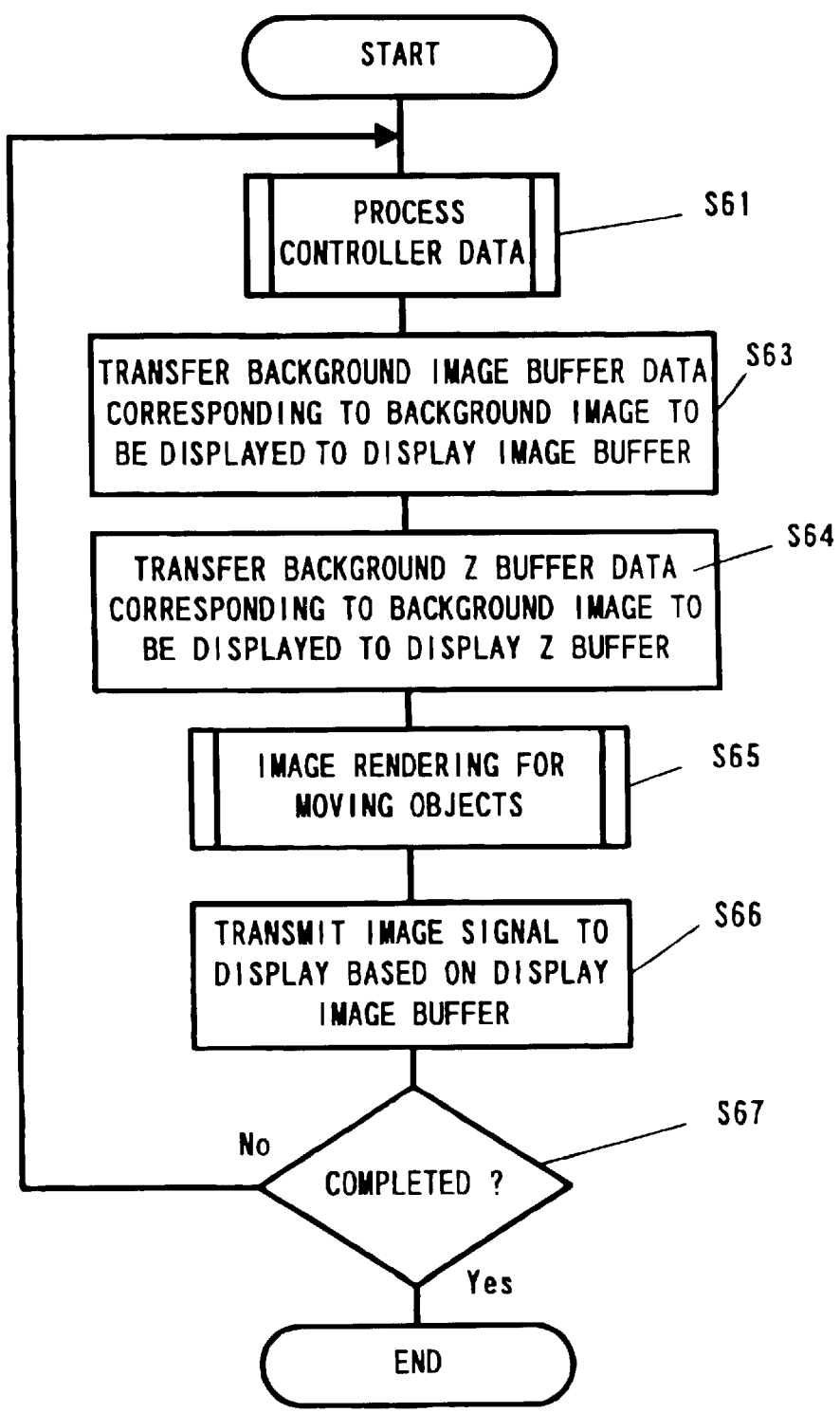
FIG. 16 is a subroutine flowchart for the processing of combining with the background object and the moving object.

In an actual game is carried out a process for displaying in combination of the background object and the moving object at a step 60 shown in FIG. 10, based on the image data of the aforesaid 6 planes on the front, rear, left, right, upper and lower of the background scenes. This synthesizing process is achieved by a subroutine flowchart shown in FIG. 16. Referring to FIG. 16, the RDP 122 performs reading of operating state data out of the controller under the control of the CPU 11, at a step 61.

Figure 17:
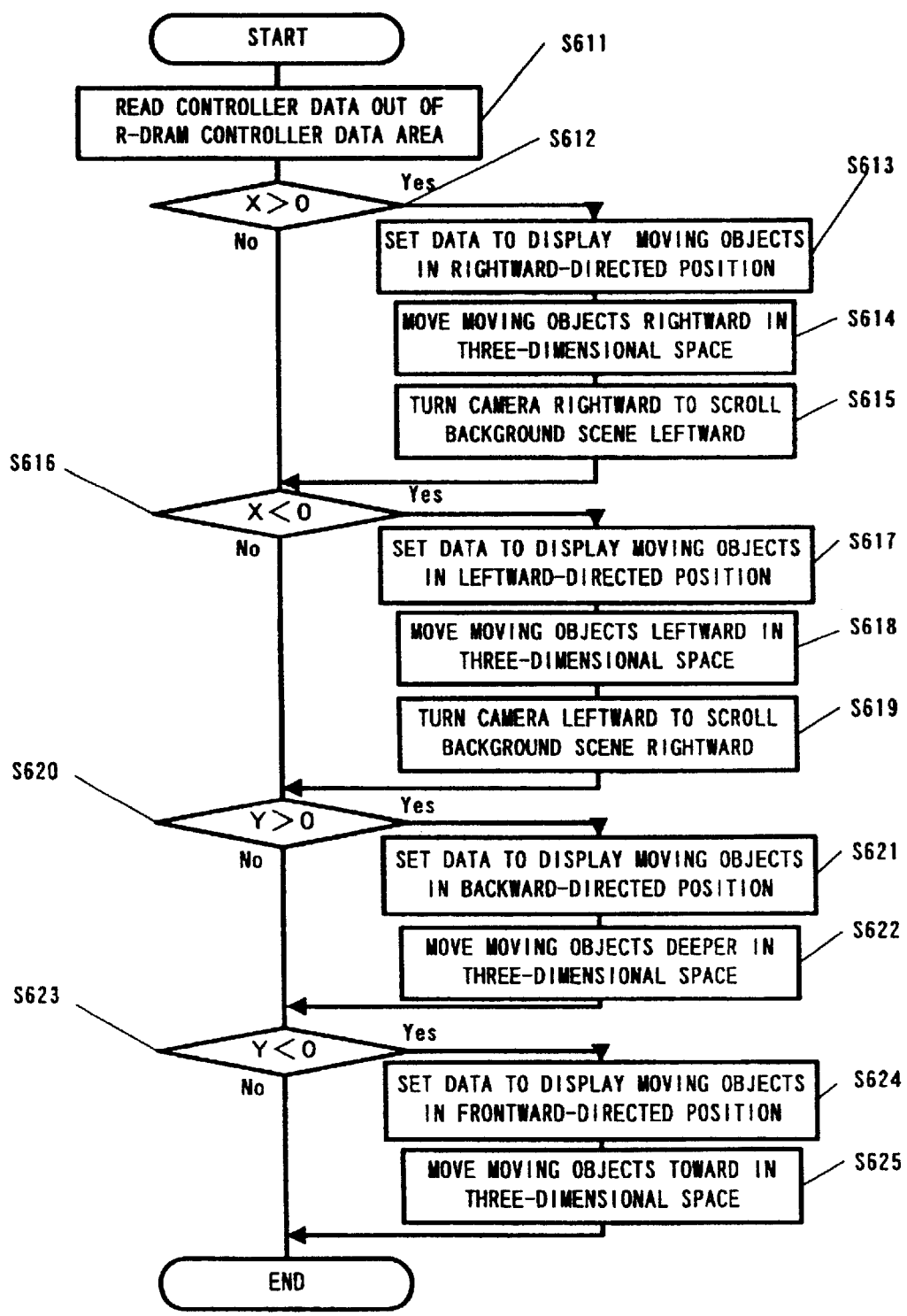
FIG. 17 is a subroutine flowchart for operations of determining operating state data who on the controller.

The detail of the step 61 is shown in an operating state data processing subroutine in FIG. 17. Referring to FIG. 17, at a step 611 the CPU 11 reads operating state data out of the operating state data area 158, and thereafter carries out the processes as given below. At a step 612, it is determined on whether the count value X of the X counter 444X is greater than zero or not. If the count value X of the X counter 444X is greater than zero is determined, the RSP 122 performs at a step 613 a process of varying the three-dimensional coordinate data for the polygon constituting the moving object 1 (e.g. process of increasing minus values of the X coordinate data for the polygons constituting the moving object 1) such that the moving object 1 is displayed in a rightward-directed position. At a subsequent step 614, the moving object 1 in the three-dimensional space is moved rightward. In interacting with this, at a step 615 the camera 4 is gradually rotated through 360 degrees by being parallel moved from the front to the right about the photograph position, thereby scrolling the background scene from the right to the left (leftward scroll). This process is achieved by setting a range of the background scene to be displayed (e.g. 5F and 5R) among a plurality of areas of the background image buffer 154 and the background Z buffer 155, for example, and thereafter shifting rightward the background scene to be displayed little by little with the set range kept constant. Then, the process proceeds to a step 616.

Meanwhile, if it is determined at the aforesaid step 612 that the count value X of the X counter 444X is smaller than zero, the process proceeds to a step 617. At the step 617, the RSP 122 performs the process of varying the three-dimensional coordinate data for the polygon constituting the moving object 1 (e.g. process of increasing the minus value of the X coordinate data), so that the moving object 1 is in a leftward-directed position. At a step 618, the displayed position of the moving object 1 in the three-dimensional space is gradually moved to the left. At a step 619, the camera 4 is parallel moved from the front to the left about the photograph position, to be gradually rotated in the left direction through 360 degrees, thereby scrolling the background scene from the left to the right (rightward scroll). This process is achieved by setting the range of background scene to be displayed (e.g. 5F and 5L) among the background image buffer areas and the background Z buffer areas, and thereafter gradually shifting to the left the background scene to be displayed with the range setting kept constant. Then, the process proceeds to a step 620.

Incidentally, at the step 616, when it is determined that the count value X of the X counter 444X is not smaller than zero (i.e. greater), then the process proceeds to the step 620.

At the step 620, the CPU 11 determines whether the count value Y of the Y counter is greater than zero or not. This determination is to determine whether the moving object 1 is to be moved in a depth direction or not, in order to provide displaying such that it advances forward when the joystick 45 is inclined forward and it retreats when inclined backward. If the count value Y of the Y counter 444Y is determined greater than 0, the three-dimensional coordinate data for the polygon constituting the moving object 1 is subjected to transformation processing at a step 621 so as to display the moving object 1 in a backward-directed position. In response to this coordinate transformation, the moving object 1 is displayed moving in the depth direction of the three-dimensional space, at a step 622. Specifically, the coordinate transformation is made such that the Z coordinate data in the three-dimensional coordinate data for the polygon constituting the moving object 1 is increased to represent the moving object 1 to go away from the camera 4 (advance in the depth direction). As a result, the moving object 1 is displayed in a manner advancing in the depth direction on the screen. Thereafter, the process proceeds to a step 623.

Meanwhile, when the count value Y of the Y counter 444Y is determined not greater (smaller) than zero at the step 620, the process also proceeds to the step 623.

At the step 623, the CPU 11 determines whether the count value Y of the Y counter 444Y is smaller than zero or not. If the count value Y of the Y counter 444Y is determined smaller than 0, at a subsequent step 624 the coordinate data for the polygons constituting the moving object 1 is transformed (e.g. processing of setting the Z coordinate data for the polygon on a breast side smaller than the Z coordinate data for the S polygon on a back side of the moving object 1) in order to display the moving object 1 in a frontward-direct position (directed toward the player). At a step 625, processing is carried out so as to display the moving object 1 to move toward the front of the three-dimensional space. Thereafter, the process proceeds to a step 63.

Incidentally, the amount of change in a position of the moving object 1 in the three-dimensional space vanes depending upon the magnitude of the respective count values of the X counter 444X and the Y counter 444Y. For example, if the count value of the X counter 444X is great, the moving object 1 is largely moved toward the right, while if the count value of the Y counter 444Y is great, the moving object 1 is greatly moved in the depth direction.

Referring again to FIG. 16, at the step 63 the color data on the background scene to be displayed (e.g. the area 1 corresponding to the background scene 5F when the camera 4 is directed frontward), which scene has been set at the step 61, is transferred from the background image buffer 154 to the image buffer 152. At a step 64, the depth data of the background scene to be displayed (e.g. the area 1 corresponding to 5F), that has been set at the step 61, is trans-ferred from the background Z buffer area 155 to the Z buffer area 153. Thereafter, the process proceeds to a step 65.

At the step 65 is performed an image synthesizing process for representing the moving object in combination with the background scene. The detail of this image synthesizing process is shown in an image combining process subroutine in FIG. 18. Referring to FIG. 18, at a step 651 the RCP 12 coordinate-transforms the three-dimensional coordinate data for the polygon constituting the moving object 1 into on-screen coordinate, to determine on-screen coordinates and depth values on a dot-by-dot basis for the moving object 1 to be taken (viewed) by the camera 4. Here, the "on-screen coordinate" refers to the display screen coordinates corresponding to the screen of the display 30, wherein the respective dot positions of display on the screen correspond to addresses in the image buffer 152 and the Z buffer 153. At a step 652, the RDP 123 reads the depth data on a certain dot position of the moving object 1 determined at the step 151 and the depth data of the background scene corresponding (i.e. common in both X coordinate data and Y coordinate data) to the dot position, to thereby compare at a step 653 the respective depth data in the same X, Y coordinate position of the moving object 1 and the background scene. As a result of the comparison, where the depth data of the moving object one is smaller (on the front of the background scene), the color data on the same dot is written into the corresponding address in the image buffer 152 at a step 654, and the dept data on the same dot of the moving object one is written into the corresponding address in the Z buffer 153.

On the other hand, when comparing the respective depth data in the same X, Y coordinate dot position of the moving object 1 and the background scene, if the depth data of the moving object 1 is determined greater, neither of the color data nor the depth data on the moving object 1 is written into the image buffer 152/Z buffer 153 because the depth position of the moving object 1 is farther than that of the background scene 5F and accordingly invisibly hidden by any background object in the background scene. Then, at the step 656, it is determined whether or not the processes of the above steps 651–655 have been ended for all the dot positions of the on-screen coordinate. If not-ended is determined, the process returns to the step 651 to repeat the processes of the above steps 651–656. If ended is determined, the process proceeds to a step 66.

At the step 66, the bus control circuit 121 outputs an image signal to the image signal generating circuit 17 based on the color data on each dot stored in the image buffer 152. Due to this, the image signal generating circuit 17 generates a signal, for example, for color representation such as video signals or RGB signals, etc. to supply the same to the display 31, thereby enabling the user to see three-dimensionally represented images on the display 31.

Thereafter, the CPU 11 determines, at a step 67, whether the combining processing subroutine is ended or not. If the combining process is determined not ended, the process to returns to the step 61 to repeat the operations of the above steps 61–67. On the other hand, if the combining process is determined ended, the process proceeds to a step 70. At the step 70, it is determined whether the game is ended or not. When the determination is not game-over, the process returns to the step 20 to repeat the aforesaid operations. Meanwhile, the CPU ends the game based on conditions if the game program stores on the game program area 151 in the RAM 15 has been executed (or if the game program stored in the external ROM 21 has entirely executed), if the player makes mistakes to a number permitted in one time of the game, or game-over conditions such as servicing over the life set by the game program.

Now, explanations will be made on operational principle by using an embodiment wherein the moving object 1 is displayed with its forward-backward relations relative to the background objects varied in a free manner.

Figure 19:
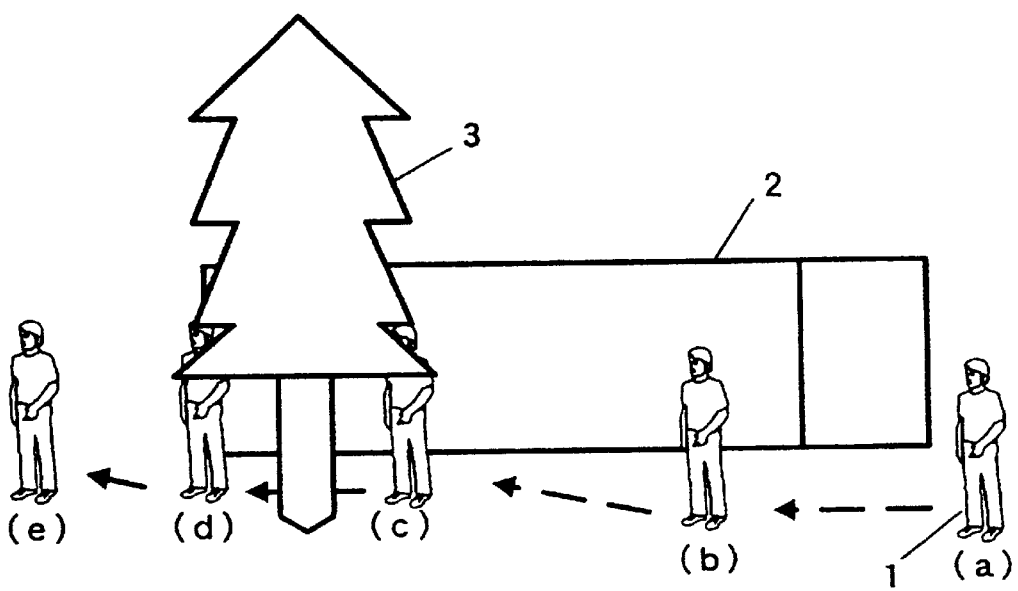
FIG. 19 is a view showing one example of synthetic representation with the background object and the moving object of the present invention.

FIG. 19 is an illustrative view showing the outcome of display where the moving object 1 is controlled of display so as to pass through between a building 2 and a tree 3. The plurality of background objects appearing in the background scene are modeled in the three-dimensional space, to be rendered as two-dimensional planar images, being presented as a background image. In this case, the image buffer 152 and the Z buffer 153 are respectively written with color data on each dot based on the texture data for the background objects 2, 3 and the depth data on the dots.

For example, when the moving object 1 is displayed in a manner passing through between the building 2 and the tree 3, the building 2 is placed at the most distant location and the moving object 1 passes in front thereof and the tree 3 is displayed at a forward location relative to the location the moving object 1 passes through. In this case, the depth data (Z data) on the dots for the polygons constituting the building 2 is selected to the largest (farthest), the depth data on the dots for the polygons constituting the tree 3 is selected to the smallest (nearest), and the depth data on the dots for the polygons constituting the moving object 1 is selected to an intermediate value of those of the both objects. When the moving object 1 moves from a position (a) through a position (b) to the left, until it reaches a position (c) before the tree 3, the depth data on the moving object 1 is smaller (frontward) than the depth data on the building 2. Accordingly, in the processing of combining the moving object and the background object, the color data on the dots for the moving object 1 is overwritten to the corresponding address of the image buffer 152 to the X and Y coordinates of the dot for each predetermined frame on the display 31. At the same time, the depth data on the dot for the moving object 1 is overwritten to the corresponding address of the Z buffer 153 to the X and Y coordinates of the dot. By virtue of this, when displayed on the display 31, the moving object 1 can be seen as if it was moving through in front of the building 2 by reading out color data stored by the image buffer 152.

When the moving object I comes to a position (c) beside the tree 3, it passes on a deeper side of the tree 3 so that its portion hidden by leaves of the tree 3 (the portion of the moving object 1 of above the breast) has the depth data greater than the depth data of the tree 3. Consequently, the color data on that portion is not overwritten to the image buffer 152, but the color data for the lower half of the moving object 1 body only is overwritten to the dot-corresponding address of the image buffer 152. Thereupon, the depth data on the dot or the moving object 1 is also written to the corresponding address of the Z buffer 153. As a result, the moving object 1 at the lower half thereof is displayed to be seen from the side of a trunk of the tree 3. Furthermore, when the moving object 1 passes behind the trunk of the tree 3, the color data for that portion is not written to the image buffer 152 so that the lower half portion of the moving object 1, upon being displayed, is invisibly hidden by the trunk. If the moving object 1 is further moved to the left, the lower half portion thereof appears from behind the trunk. After passing past a position (d), the color data on the entire body is written into the image buffer 152, displaying the entire portion of the moving object 1.

On the other hand, in order to display an image to pass the moving object 1 through the front of the building 2 and the tree 3, program setting may be made such that the Z coordinate data on the dots for all the polygons constituting the moving object 1 is determined smaller than the Z coordinate data on the dots for the polygons respectively constituting the building 2 and the tree 3. This causes the color data of the dots for all the polygons constituting the moving object 1 is written into the image buffer 152 in order during the entire time period that the moving object 1 is moving from the position (a) to the position (e), and the depth data on the dots is written into the Z buffer 153 in order. As a result, when the color data stored in the image buffer 152 is read out in synchronism with raster scanning over the display 31, an image as shown in FIG. 1 is displayed.

Figure 2:
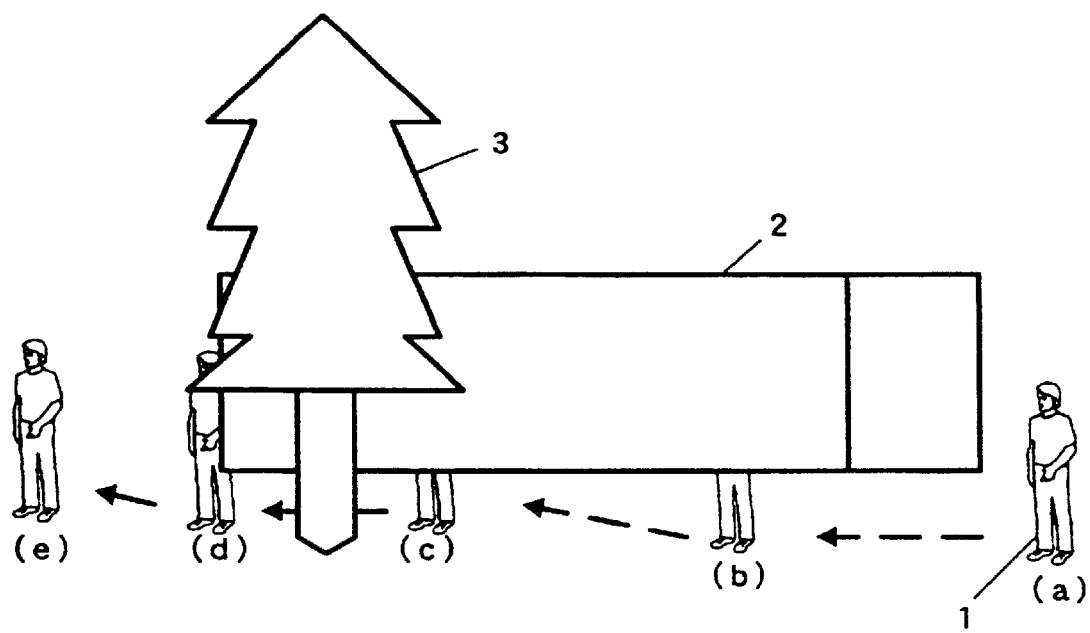
FIG. 2 is a view showing another example of an on-screen space where the background objects and the moving object are displayed by the prior art.

Conversely, in order to display the image to pass the moving object 1 behind the building 2 and the tree 3, program setting may be made such that the Z coordinate data on the dots for all the polygons constituting the moving object 1 is determined greater than the Z coordinate data on the dots for the polygons respectively constituting the building 2 and the tree 3. This causes the color data on the dots for all the polygons constituting the moving object 1 not to be written into the image buffer 152 over the duration that the moving object 1 is moving from the right end to the left end. The writing-in of the moving object 1 is made only when it is positioned at a location where there is no background objects present. As a result, when the color data stores by the image buffer 152 is read out in synchronism with raster scanning over the display 31, an image as shown in FIG. 2 is displayed.

As explained above, according to the present embodiment, even where a plurality of objects are overlapped, the background scene can be three-dimensionally represented at overlapped and non-overlapped portions by temporarily storing depth data into the Z buffer during image rendering in a manner similar to actual perspectives, despite utilizing with only one scene of the image buffer.

Incidentally, although in the above embodiment explanations have been made for the case that a plurality of background objects and at least one moving object are displayed overlapped, the principle of this invention is also applicable for displaying preferentially a nearer background object based on the depth-directional relations to only the background objects. Furthermore, although in the above embodiment explanations have been made for the case that the background object and the moving object are combined with and the color data stored by the image buffer 152 is read out in synchronism with raster scanning, if a CPU with a high process capability is utilized, the image data for only the background scene may be stored in the image buffer 152 to output the color data for either one of the background scene or the moving object based on the order of priority when the color data is read out of the image buffer 152.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image creating apparatus for creating an image formed by a gathering of dots for a plurality of scenes as viewed in two or more different directions from a certain view point existing in a three-dimensional space, said apparatus comprising:

a background object polygon image data generator for generating background object polygon image data including three-dimensional coordinate data and texture data for each polygon so as to represent a background object existing in a three-dimensional space;

a moving object polygon image data generator for generating moving object polygon image data including three-dimensional coordinate data and texture data for each polygon so as to represent a moving object existing in a three-dimensional space;

an operator input device for generating moving object position data for controlling the display position of said moving object;

a color data storage having a storing capacity corresponding to the number of the dots for a plurality of background scenes, to temporarily store color data on each background scene on a dot-by-dot basis;

depth data storage having a storing capacity corresponding to the number of the dots for the plurality of the background scenes, to temporarily store depth data on the background scene on a dot-by-dot basis;

a color data generator for converting into dot image data the polygon image data associated with the background object out of the polygon image data obtained upon being directed in different directions in the three-dimensional space at the certain view point, to generate color data on the dot-by-dot basis on the basis of texture data of each polygon;

a color data writer for writing the color data in a plurality of directions generated by said color data generator into corresponding storing positions of said color data storage;

a moving object position evaluator for determining the display position of said moving object based on data from said input device;

a depth data generator for determining, by computation, the depth data on the dot depending upon the three-dimensional coordinate data of the polygon when converting the polygon image data associated with the background object into the dot image data out of the polygon image data obtained upon being directed in different directions in the three-dimensional space at the certain view point, to generate the depth data on the dot-by-dot basis; and a depth data writer for writing the depth data into said depth data storage wherein when said moving object is moved to a predetermined display position with respect to a background scene as determined by said moving object position evaluator, said depth data writer and said color data writer are controlled to save color data and depth value data respectively to said depth data storage and said color data storage.

2. An image creating apparatus according to claim 1, wherein said color data generator converts the background polygon image data for the background object generated by said first polygon image data generator into color data of dot image for the background object, and the polygon image data for the moving object generated by said second polygon image data generator into dot image data for the moving object after the color data are written into said color data storage by said color data writer, and generates color data on one of the background object and the moving object which is closer to the view point depending upon the respective depth data being stored in said depth data storage and corresponding to the color data stored in said data storage, and the depth data of the moving object polygon.

3. An image creating apparatus according to claim 1, wherein said background object polygon image data generator is operable to automatically generate a background object when said moving object is moved to a predetermined location in the three-dimensional space.

4. An image creating apparatus according to claim 1, wherein said color data storage and said depth data storage respectively have storage capacities for storing, on a dot-by-dot basis, the color data and the depth data of the object existing in the background scene obtained by dividing a 360-degree range through-parallel rotation about the view point, said color data writer writing, on the dot-by-dot basis, the color data of the object existing in the divided background scene into a corresponding storage position of said color data storage to the background scene, and said depth data writer writing, on the dot-by-dot basis, the depth data on the object existing in the divided background scene into a corresponding storage position of said depth data storage to the background scene.

5. An image creating apparatus according to claim 4, wherein said color data storage and said depth data storage respectively have storage areas of six planes of the background scenes, and said color data writer and said depth data writer respectively writing the color data and the depth data into a corresponding plane of the six planes, on the left, right, front, rear, upper and lower, as viewed from the view point, in said color data storage and said depth data storage at a storage position corresponding to the dot of the object.

6. An image creating apparatus according to claim 4, wherein said background object polygon image data generator is operable to automatically generate a background object when said moving object is moved to a predetermined location in the three-dimensional space.

7. An image display apparatus for displaying on a raster scan display an image formed by a gathering of a plurality of dots for a plurality of scenes as viewed in two or more different directions from a certain view point existing in a three-dimensional space, said apparatus comprising:

a polygon image data generator for generating polygon image data formed by three-dimensional coordinate data and texture data for each polygon so as to represent a background object and a moving object existing in the three-dimensional space by a plurality of polygons;

a color data storage having a storage capacity corresponding to the number of dots for a plurality of background scenes, to temporarily store color data on each background scene on a dot-by-dot basis;

a depth data storage having a storage capacity corresponding to the number of dots for the plurality of the background scenes, to temporarily store depth data on the background scene on a dot-by-dot basis;

an operator input device for generating moving object position data for controlling the display position of said moving object;

a color data generator for converting into dot image data the polygon image data associated with the background object out of the polygon image data obtained upon being directed in different directions in the three-dimensional space at the certain view point, to generate color data on a dot-by-dot basis on the basis of the texture data of each polygon;

a color data writer for writing the color data in a plurality of directions generated by said color data generator into corresponding storage positions of said color data storage;

a depth data generator for determining, by computation, the depth data on the dot depending upon the three-dimensional coordinate data of the polygon when converting the polygon image data associated with the background object into the dot image data out of the polygon image data obtained upon being directed in different directions in the three-dimensional space at the certain view point, to generate the depth data on the dot-by-dot basis;

a depth data writer for writing the depth data for a plurality of directions generated by said depth data generator into corresponding storage positions of said depth data storage;

a reader for reading the color data generated by said color data generator in synchronism with raster scanning over said raster scan display; and a moving object position evaluator for determining the display position of said moving object based upon data from said input device, wherein when said moving object is moved to a predetermined display position with respect to a background object as determined by said moving object position evaluator, said color data writer and said depth data writer are controlled to save color data and depth value data to said color data storage and said depth value storage respectively.

8. An image display apparatus according to claim 7, wherein said polygon image data generator is operable to automatically generate a background object when said moving object is moved to a predetermined location in the three-dimensional space.

9. An image display apparatus according to claim 7, wherein said polygon image data generator includes a first polygon image data generator for generating background polygon image data formed by three-dimensional coordinate data and texture data on the polygon for the background object in order to represent the background object existing in the three-dimensional space by a plurality of polygons, a second polygon image data generator for generating moving object polygon image data constituted by three-dimensional co-ordinate data and texture data on the polygon for the moving object to be displayed in order to synthesize the moving object with the background polygon image generated by said first polygon image data generator and represent the moving object by the plurality of the polygons, wherein said color data generator converts the background polygon image data for the background object generated by said first polygon image data generator into color data of dot image for the background object, and the polygon image data for the moving object generated by said second polygon image data generator into dot image data for the moving object after the color data is written into said color data storage by said color data writer, and generates color data on one of the background object and the moving object which is closer to the view point depending upon the respective depth data being stored in said depth data storage and corresponding to the color data stored in said color data storage, and the depth data of the moving object polygon.

10. An image display apparatus according to claim 9, wherein said polygon image data generator is operable to automatically generate a background object when said moving object is moved to a predetermined location in the three-dimensional space.

11. An image display apparatus according to claim 7, wherein said color data storage and said depth data storage respectively have storage capacities for storing, on a dot-by-dot basis, the data and the depth data of the object existing in the background scene obtained by dividing a 360-degree range through parallel rotation about the view point;

said color data writer writing, on the dot-by-dot basis, the color data on the object existing in the divided background scene into a corresponding storage position of said color data storage to the background scene, and said depth data writer writing, on the dot-by-dot basis, the depth data on the object existing in the divided background scene into a corresponding storage position of said depth data storage to the background scene.

12. An image display apparatus according to claim 7, wherein said image display apparatus includes an input section for changing the range of display of the background scene viewed from the view point, said reader changing the readout address in said color data storage so as to change the range of the background scene in response to the operation of said input section.

13. An image display apparatus according to claim 12, wherein said polygon image data generator includes a first polygon image data generator for generating background polygon image data formed by three-dimensional coordinate data and texture data on the polygon for the background object in order to represent the background object existing in the three-dimensional space by the plurality of the polygons, a second polygon image data generator for generating moving polygon image data constituted by three-dimensional coordinate data and texture data on the polygon for the moving object to be displayed in order to synthesize the moving object with the background polygon image generated by said first polygon image data generator and represent the moving object by the plurality of the polygons, wherein said color data generator converts the background polygon image data for the background object generated by said first polygon image data generator into color data of dot image for the background object, and the polygon image data for the moving object generated by said second polygon image data generator into dot image data for the moving object after the color data is written into said color data storage by said color data writer, and generates color data on one of the background object and the moving object which is closer to the view point depending upon the respective depth data being stored in said depth data storage and corresponding to the color data stored in said color data storage, and the depth data of the moving object polygon.

14. An image display apparatus according to claim 11, wherein said image display apparatus includes an input section for changing the range of display of the background scene viewed from the view point, said reader changing the readout address in said color data storage so as to change the range of the background scene in response to the operation of said input section.

15. An image creating apparatus for creating an image formed by a gathering of dots for a plurality of scenes as viewed in two or more different directions from a certain view point existing in a three-dimensional space, said apparatus comprising:

a background object polygon image data generator for generating background object polygon image data including three-dimensional coordinate data and texture data for each polygon so as to represent a background object existing in a three-dimensional space;

a moving object polygon image data generator for generating moving object polygon image data including three-dimensional coordinate data and texture data for each polygon so as to represent a moving object existing in a three-dimensional space;

an operator input device for generating data controlling the display position of said moving object;

a color data storage to temporarily store color data for a plurality of background scenes on a dot-by-dot basis;

depth data storage to temporarily store depth data for a plurality of background scenes on a dot-by-dot basis;

a color data generator for converting into dot image data the polygon image data associated with the background object to generate color data on the dot-by-dot basis on the basis of texture data of each polygon;

a color data writer for writing the color data generated by said color data generator into said color data storage;

a moving object detector for detecting the display position of said moving object based on data from said input device;

a depth data generator for determining the depth data to generate the depth data on the dot-by-dot basis; and a depth data writer for writing the depth data into said depth data storage, wherein when said moving object is moved to a predetermined display position with respect to a background object, said depth data writer and said color data writer are operable to save said color data and depth value data respectively to said depth data storage and said color data storage.

16. An image creating apparatus according to claim 15, wherein said color data storage and said depth data storage respectively have storage capacities for storage, on a dot-by-dot basis, the color data and the depth data of the object existing in the background scene obtained by dividing a 360-degree range through parallel rotation about the view point, said color data writer writing, on the dot-by-dot basis, the color data of the object existing in the divided background scene into a corresponding storage position of said color data storage to the background scene, and said depth data writer writing, on the dot-by-dot basis, the depth data on the object existing in the divided background scene into a corresponding storage position of said depth data storage to the background scene.

17. An image creating apparatus according to claim 16, wherein said color data storage and said depth data storage respectively have storage areas for six planes of the background scenes, and said color data writer and said depth data writer respectively writing the color data and the depth data into a corresponding place of the six planes, on the left, right, front, rear, upper and lower, as viewed from the view point, in said color data storage and said depth data storage at a storage position corresponding to the dot of the object.

18. For use in a three-dimensional videographics display system having an image processing system for displaying background objects and moving objects, and a player controller for generating moving object display position data, a method for displaying moving objects and background objects comprising the steps of:

generating polygon image data in the form of three-dimensional co-ordinate data and texture data for each polygon to represent a background object existing in the three-dimensional space by a plurality of polygons;

generating polygon image data in the form of three-dimensional co-ordinate data and texture data for each polygon to represent a moving object existing in the three-dimensional space by a plurality of polygons storing color data for a plurality of background objects on a dot-by-dot basis;

storing depth data, for a plurality of background objects on a dot-by-dot basis;

determining based upon said moving object display position data whether a moving object has reached a predetermined display position with respect to a background object;

evaluating on a dot by dot basis stored depth data for said background object when said moving object has reached said predetermined display position with respect to a background object;

writing on a dot by dot basis, depending upon the result of said evaluating step, color data associated with said moving object to a display image buffer; and writing on a dot by dot basis, depending upon the result of said evaluating step, depth data associated with said moving object to a display depth data storage.

19. A method according to claim 18, further including the step of storing, on a dot-by-dot basis, color data and the depth data of a background object existing in a background scene obtained by viewing the object through different perspectives through a substantially 360-degree range.

20. A method according to claim 18, further including the steps of converting the background polygon image data for the background object into dot image color data for the background object and the moving object, and generating color data on one of the background object and the moving object which is closer to the view point depending upon stored depth data and the depth data of the moving object polygon.

21. A method according to claim 18, further including the step of storing color data and said depth data for each of six background scenes formed based upon the left, right, front, rear, upper and lower views of a predetermined scene.

22. A method according to claim 18, further including the step of generating a background object when said moving object is moved to a predetermined location in three-dimensional space.

* * * * *